United States Patent [19]
Lubbers et al.

[11] Patent Number: 6,149,248
[45] Date of Patent: Nov. 21, 2000

[54] HYDRAULIC BRAKE BOOSTER

[75] Inventors: Mark D. Lubbers; Gerald M. Sivulka, both of Ann Arbor, Mich.; Edward N. Fuller, Manchester, Mich.; Stephen H. Youtsey, Palo Alto, Calif.; Richard J. Barron, Ann Arbor, Mich.

[73] Assignee: Kelsey-Hayes Company, Livonia, Mich.

[21] Appl. No.: 09/191,177

[22] Filed: Nov. 13, 1998

Related U.S. Application Data

[63] Continuation of application No. PCT/US97/08151, May 9, 1997.
[60] Provisional application No. 60/017,739, May 15, 1996.

[51] Int. Cl.$^7$ ...................................... F16D 31/02
[52] U.S. Cl. .................... 303/114.1; 188/358; 303/113.4
[58] Field of Search ............... 303/113.4, 114.1, 303/114.2, 114.3, 155, 3, DIG. 3, DIG. 4, 166–167, 15; 188/355–359; 60/545, 534, 549, 560, 578; 91/369.1–369.4, 376 R; 701/70, 71, 78, 83

[56] References Cited

U.S. PATENT DOCUMENTS

| | | |
|---|---|---|
| 4,395,883 | 8/1983 | Melinat . |
| 4,678,243 | 7/1987 | Leiber ................................. 303/113.4 |
| 4,743,072 | 5/1988 | Brearley . |
| 4,768,841 | 9/1988 | Watanabe .............................. 303/113.4 |
| 4,914,917 | 4/1990 | Schonlau .............................. 303/113.4 |
| 4,919,493 | 4/1990 | Leiber ................................. 303/113.4 |
| 5,098,171 | 3/1992 | Siegel . |
| 5,445,441 | 8/1995 | Inagawa et al. . |
| 5,531,509 | 7/1996 | Kellner et al. ........................... 188/358 |
| 5,549,361 | 8/1996 | Sorenson . |
| 5,983,637 | 11/1999 | Lubbers et al. . |
| 6,007,160 | 12/1999 | Lubbers et al. ....................... 303/114.1 |
| 6,053,582 | 4/2000 | Ganzel ................................... 188/358 |

FOREIGN PATENT DOCUMENTS 60-88673  5/1985  Japan .

*Primary Examiner*—Douglas C. Butler
*Attorney, Agent, or Firm*—MacMillan, Sobanski & Todd, LLC

[57] ABSTRACT

A vehicle hydraulic system is disclosed comprising a pressure source supplying pressurized hydraulic fluid to a discharge header, a vehicle braking system having a hydraulically operated boost piston assembly for supplementing a force exerted by a vehicle operator to operate brakes of the vehicle braking system; a boost pressure control valve for selectively directing pressurized hydraulic fluid from the discharge header to boost piston assembly and venting hydraulic fluid from the boost piston assembly; and a sensor for receiving an input from a vehicle operator and supplying an electrical signal to the boost pressure control valve to control the operation thereof.

13 Claims, 19 Drawing Sheets

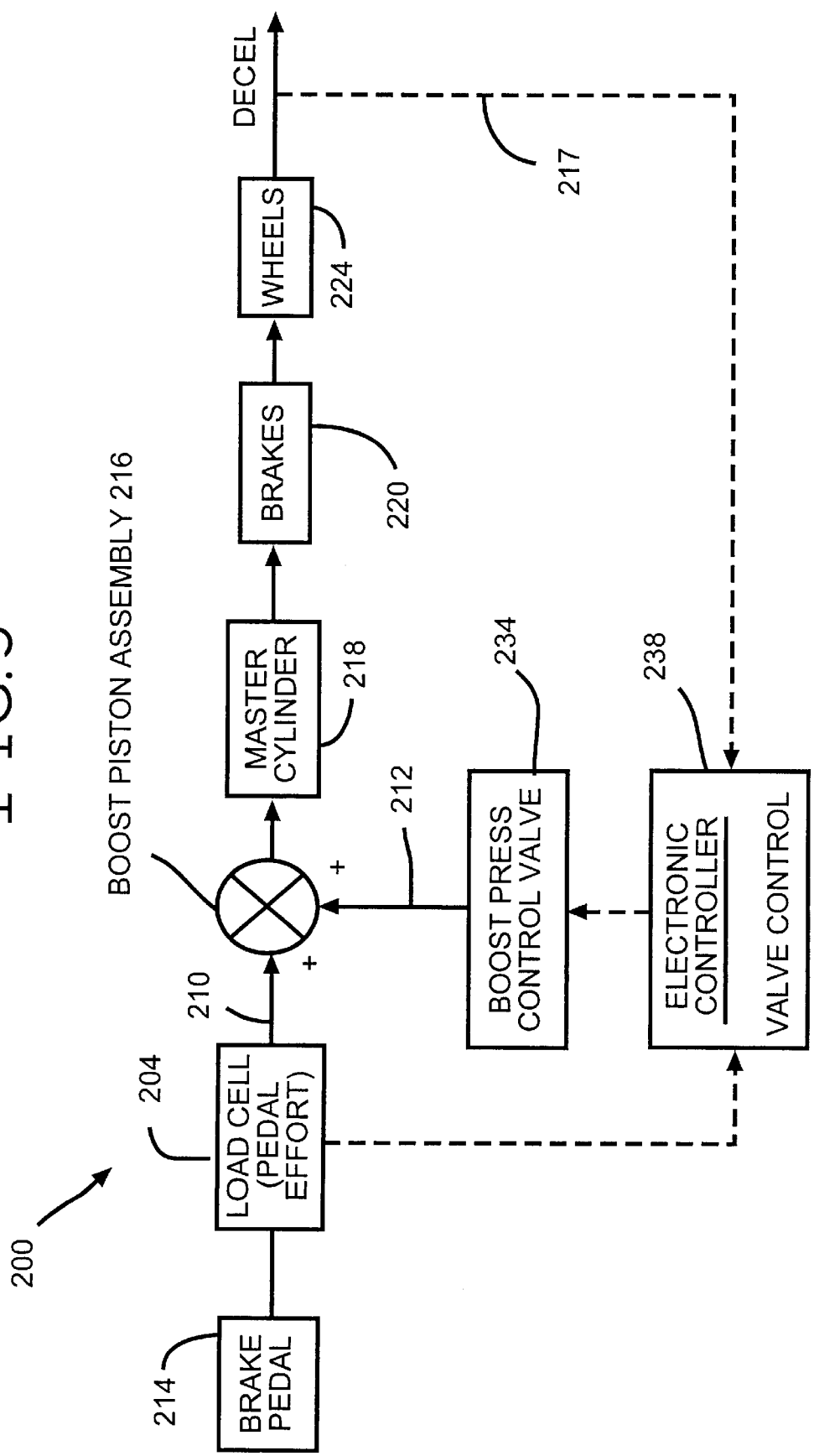

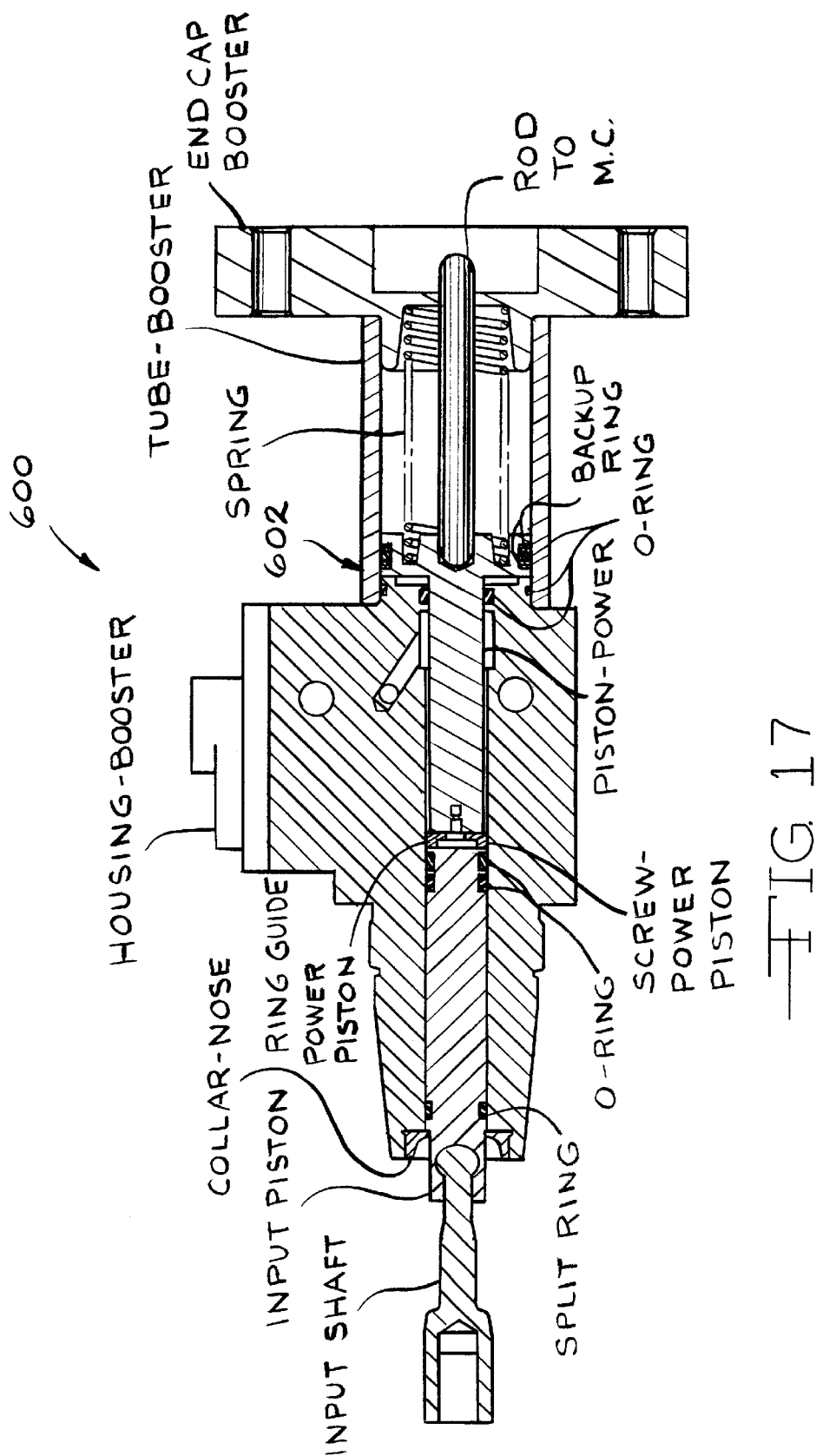

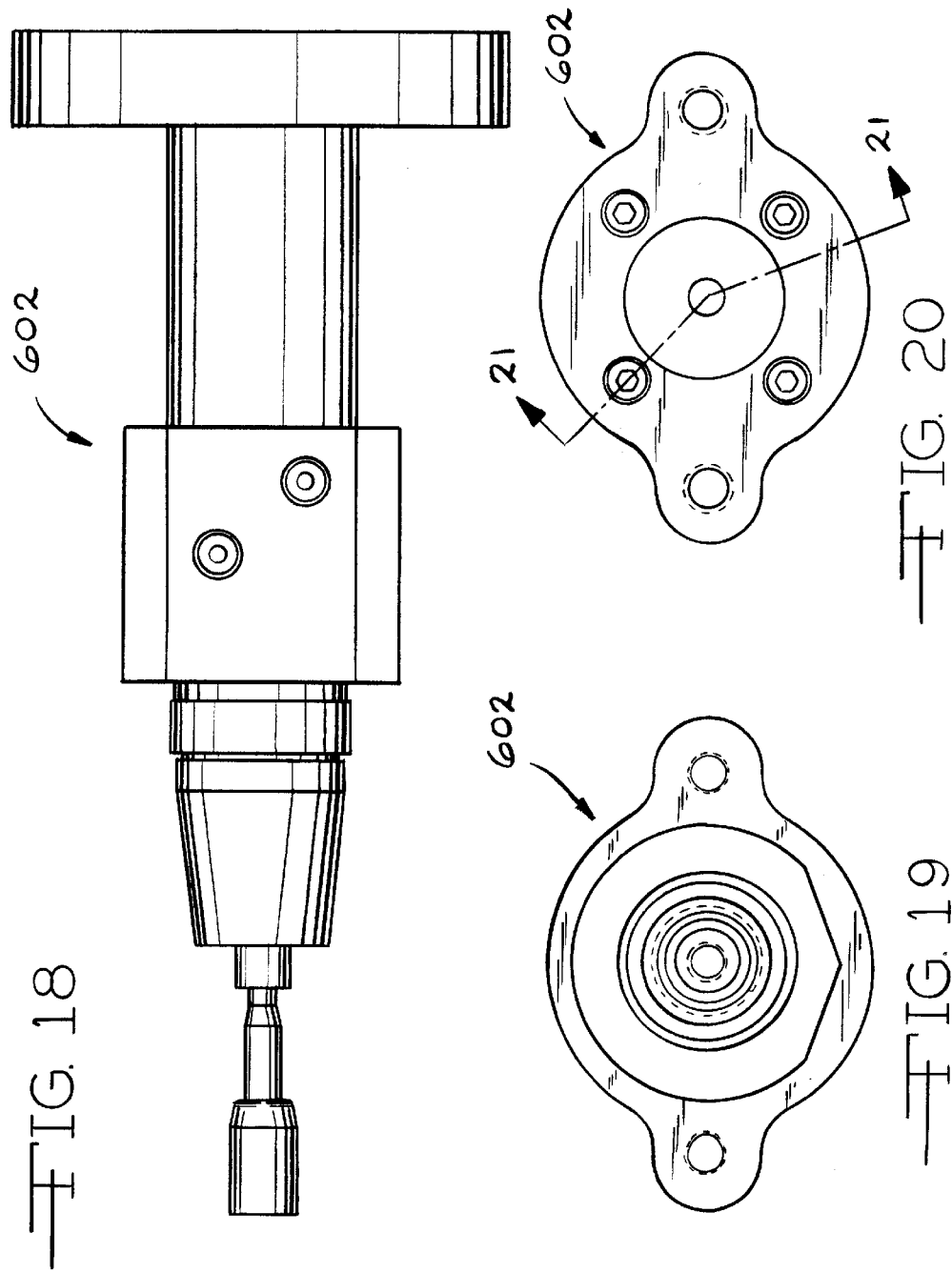

HYDRAULIC BRAKE BOOSTER

This application is a continuation, which claims benefit under 35 USC119(e) of U.S. provisional application 60/017,739 filed May 15, 1996.

BACKGROUND OF THE INVENTION

This invention relates in general to brake systems for motor vehicles, and in particular to fluid pressure operated brake boosters for vehicle braking systems.

Conventional vehicle brake systems are constructed such that the braking force developed by the system is generally proportional to the force applied by the vehicle operator on a vehicle brake pedal. The pedal is linked to a piston in a master cylinder which moves to pressurize the fluid of the brake system, and thus actuate the individual wheel brakes. Generally, in order to provide a sufficiently high pressure to operate the wheel brakes without requiring an excessive effort by the operator, most vehicles include a "boosted" power brake system wherein the force applied to the brake pedal by the operator is amplified or boosted before being applied to the master cylinder. In automobiles and light trucks, this is typically accomplished by incorporating either a vacuum or hydraulically operated boost piston assembly between the brake pedal and the master cylinder.

Vacuum operated boost piston assemblies utilize the pressure differences between the atmosphere and the vehicle's engine vacuum to develop a force across a boost piston or diaphragm. The force developed by this differential pressure across the boost piston may be many times that which could be developed by the operator by pressing against the pedal, and is applied to the piston of the master cylinder to actuate the brakes.

Hydraulic boost piston assemblies utilize the pressure developed by a hydraulic system, for example, using the vehicle's power steering pump, to apply a force to a boost piston. The force applied by the hydraulic system to the boost piston, like the vacuum boost system, may be many times that which could be applied by the operator of the vehicle when operating the brake pedal through the same stroke length used to actuate the hydraulic boost piston assembly. Thus, the increased force applied to the piston of the master cylinder generates higher braking system operating pressures.

Hydraulic brake boosters may be classified into two categories, namely, two-sided piston designs and single-sided piston designs. A two-sided piston design, as used herein, means a brake booster in which one side of the boost piston is selectively exposed to a boost pressure from upstream of a boost pressure control valve, and the other side of the boost piston is continuously connected to the discharge side of the boost pressure control valve, so that a differential pressure developed across the boost pressure control valve may be applied to the boost piston of the brake booster. In contrast, a single-sided piston design, as used in this application, means a brake booster in which a boost pressure is selectively applied to one side of the boost piston of a brake booster, while the other side of the boost piston is vented to a location other than the discharge of the boost pressure control valve, such as a hydraulic system reservoir, or to atmosphere.

Although past hydraulic brake boosters have served relatively satisfactorily, there is a need for hydraulic brake boosters of different designs to increase flexibility in the design of braking system. In particular, there is a need for hydraulic brake boosters which can be used with an associated electrically controlled pressure control valve and which do not require a two-sided piston design.

SUMMARY OF THE INVENTION

Briefly, the present invention comprises, in one embodiment, a vehicle hydraulic system including a pressure source supplying pressurized hydraulic fluid to a discharge header; a vehicle braking system having a hydraulically operated boost piston assembly for supplementing a force exerted by a vehicle operator to operate brakes of the vehicle braking system; a boost pressure control valve for selectively directing pressurized hydraulic fluid from the discharge header to the boost piston assembly and venting hydraulic fluid from the boost piston assembly; and a sensor for receiving an input from a vehicle operator and supplying an electrical signal to the boost pressure control valve to control the operation thereof.

In a further aspect of the present invention, the boost piston assembly may include a hollow housing having an inner wall defining a boost chamber and an input chamber therein. The boost piston assembly may further include a boost piston in sliding sealing contact with the inner wall within the boost chamber and extending into the input chamber. The boost piston assembly may further include a seal preventing fluid communication between the input chamber and the boost chamber and may also include an input piston contacting a brake pedal arm which is operatively coupled to a brake pedal. The input piston is in sliding sealing contact with the inner wall of the input chamber, with the input piston contacting or being hydraulically coupled to the boost piston. The brake pedal arm selectively urges the input piston to move in a first direction to move the boost piston in the first direction in order to actuate the brakes. The pressurized hydraulic fluid is selectively supplied to and vented from the boost chamber to selectively aid the brake pedal arm in urging the boost piston to move in the first direction.

In yet a further aspect of the present invention, a pressure controlling valve may be included to selectively admit a portion of pressurized hydraulic fluid supplied to the boost chamber and to the input chamber, whereby the pressure in the input chamber can be controlled independently of the pressure in the boost chamber. In one embodiment, this pressure controlling valve can be selectively closed to seal a quantity of hydraulic fluid in the pedal chamber.

In a second embodiment of the present invention, a hydraulic brake system for a vehicle is disclosed comprising a brake which may be actuated to retard motion of the vehicle; a source of pressurized hydraulic fluid; an assembly for selectively supplying pressurized hydraulic fluid to the brake from the source; and a sensor for generating a first signal representative of a deceleration demanded by a driver of the vehicle. The system may further include a sensor for generating a second signal representative of the deceleration of the vehicle; and a controller for selectively controlling the assembly in response to the first and second signals so as to cause the deceleration to equal the deceleration demanded.

In a further aspect of the present invention, a brake booster system is disclosed comprising a housing defining an axial bore therein; a boost piston slidable in the bore and cooperating with the housing to define a boost chamber; and an input member selectively movable by an operator and operatively connected to move the boost piston with a first force exerted by the operator. The system further includes an output member adapted to operatively connect the boost piston to a master cylinder piston of a brake system master cylinder; and a controller for selectively admitting a pressurized hydraulic fluid into the boost chamber to urge the boost piston to move such that the boost piston exerts a second force on the output chamber which is greater than the first force.

In a further aspect of this embodiment, the brake booster may include an input piston slidable in the bore, with the input piston and the boost piston cooperating with the housing to define a pedal chamber, with the input member contracting the input piston to selectively urge the input piston in a first direction, and the boost piston being urged in the first direction as a consequence of the input piston moving in the first direction.

In a yet further aspect of this embodiment, pressurized hydraulic fluid may be simultaneously directed by the controller into the boost chamber and the pedal chamber at equal pressures. Alternatively, pressurized hydraulic fluid may be directed by the controller into the boost chamber and into the pedal chamber at independently controlled pressures.

In yet a further aspect of this embodiment, the brake booster may include a first fluid conduit through which the controller supplies pressurized hydraulic fluid to the pedal chamber; and a second fluid conduit providing fluid communication between the first fluid conduit and the boost chamber, with the second fluid conduit including a check valve permitting hydraulic fluid to flow through the check valve into the boost chamber and preventing hydraulic fluid from flowing through the check valve from the boost chamber to the first fluid conduit. This embodiment further includes a third fluid conduit providing fluid communication between the first fluid conduit and the boost chamber around the check valve, with the third fluid conduit including an orifice restricting free flow of the hydraulic fluid in the third fluid conduit.

In a yet further aspect of this embodiment, at least one fluid conduit may be provided between a source of pressurized hydraulic fluid and a reservoir of relatively unpressurized hydraulic fluid. The embodiment may further include a first pressure control valve situated in the fluid conduit and responsive to the controller for selectively supplying the pressurized hydraulic fluid from the fluid conduit to the pedal chamber and venting from the pedal chamber to the reservoir, and a second pressure control valve situated in the fluid conduit and responsive to the controller for selectively supplying the pressurized hydraulic fluid from the fluid conduit to the boost chamber and venting from the boost chamber to the reservoir.

In yet a further embodiment of the present invention, a hydraulic brake boost system is provided for operating a master cylinder including: a brake booster; a brake pedal; and means for controlling the brake booster such that a reaction force experienced by a user stepping on the brake pedal can be controlled independently of the force exerted by the brake booster upon a piston of the master cylinder.

In yet a further embodiment of the present invention, a hydraulic brake boost control valve is provided for selectively supplying pressurized hydraulic fluid at a desired pressure to a brake booster, with the brake boost control valve being responsive to both mechanical and electrical actuators.

In yet a further embodiment of the present invention, a hydraulic boost system for pedal operated hydraulic brakes for vehicle wheels is disclosed comprising a brake master cylinder in fluid communication with the brakes; a brake booster cylinder; a brake booster piston in the booster cylinder defining with the booster cylinder a boost pressure working chamber; apparatus for transferring pedal force to the brake booster piston; apparatus for sensing the pedal force and for developing a system variable; and an electronic circuit responsive to the variable to obtain a controlled increase in the brake booster pressure when the pedal force increases.

In yet a further aspect of this embodiment, the electronic circuit responsive to the variable may comprise an electronic microprocessor, with the system variable being distributed by the pressure boost system to an input signal conditioning portion of the microprocessor, wherein the microprocessor develops an electronic signal indicative of the magnitude of the variable, and a solenoid operated valve means communicating with the brake boost pressure source and responsive to the signal for varying the boost pressure in the booster cylinder.

In a yet further aspect of this embodiment, the apparatus for transferring pedal force to the brake booster piston comprises a pedal actuated piston, a boost pressure control chamber, a portion of the brake pressure booster piston and the pedal operated piston being disposed in the booster pressure control chamber, with the pressure in the booster pressure control chamber increasing as a function of pedal travel and pedal effort. This aspect further includes a pressure transducer means for sensing the booster chamber pressure and for developing the variable as an indication of the booster chamber pressure.

In a yet further aspect of this embodiment, the pedal actuated piston may have a diameter greater than the diameter of the portion of the brake pressure booster piston portion, whereby the travel of the brake booster piston is greater than the travel of the pedal operated piston for any given pedal travel.

In a yet further aspect of this embodiment, the boost system may include means for developing the electronic signal as a function of both pedal travel and vehicle deceleration, whereby vehicle deceleration for any given pedal force remains substantially unchanged regardless of changes in vehicle weight.

In yet a further embodiment of the present invention, a method is disclosed for providing boost pressure for pedal operated hydraulic brakes for vehicle wheels, comprising the steps of: transferring a pedal demand signal representative of a pedal force to a brake booster piston to cause said brake booster piston to apply a boost pressure, wherein said brake booster piston is in communication with a master cylinder; generating an electronic system variable based on the pedal demand signal; and, supplementing the boost pressure supplied by the booster piston in accordance with the system variable to apply a second force to the brake booster piston in accordance with the system variable.

In a further aspect of this method, the generating step comprises the step of generating the electronic system variable as a function of both pedal force and vehicle deceleration.

In yet a further aspect of this method, the transferring and supplementing steps are accomplished by independently controlling hydraulic pressure to a pedal chamber and to a boost chamber. This independently controlling hydraulic pressure step may be accomplished by applying hydraulic fluid in a first fluid conduit to the pedal chamber; applying hydraulic fluid in a second fluid conduit only in the direction from the first fluid conduit to the boost chamber; and venting fluid in a third fluid conduit restrictively from the boost chamber to the first fluid conduit.

In a further aspect of this method, the independently controlling hydraulic pressure step may be accomplished by electronically controlling a first valve in accordance with a signal based on the electronic system variable to apply hydraulic fluid to the pedal chamber; and electronically controlling a second valve to apply hydraulic fluid to the boost chamber in accordance with a function based on the pedal demand and vehicle deceleration.

In a further embodiment of the method for hydraulic braking of the present invention, the method comprises the steps of generating a first signal representative of deceleration demanded by a driver of a vehicle; generating a second signal representative of deceleration of the vehicle; adding a supplementary force to a boost piston communicating with a master cylinder of a brake for the vehicle, with the supplementary force being a function of the first and second signals.

In a further embodiment of the present invention, a method for providing boost pressure for pedal operated hydraulic brakes for vehicle wheels is disclosed, comprising the steps of: transferring by mechanical linkage a pedal demand from a brake pedal to a booster piston which is in communication with a master cylinder to cause the booster piston to move in response thereto; and electrically actuating the booster piston in response to a control signal generated based on at least one vehicle movement characteristic.

BRIEF DESCRIPTION OF THE DRAWINGS

FIG. 5 is a schematic block diagram of a brake control system representing a further embodiment of the present invention.

FIG. 17 is a sectional view of the integrated body 600 taken along the lines 17—17 of FIG. 13.

FIG. 18 is a top view of the brake booster assembly 602 shown in FIG. 17.

FIG. 19 is a left side view of the brake booster assembly 602 shown in FIG. 17.

FIG. 20 is a right side view of the brake booster assembly 602 shown in FIG. 17.

DETAILED DESCRIPTION OF THE PREFERRED EMBODIMENTS

Figure 1:
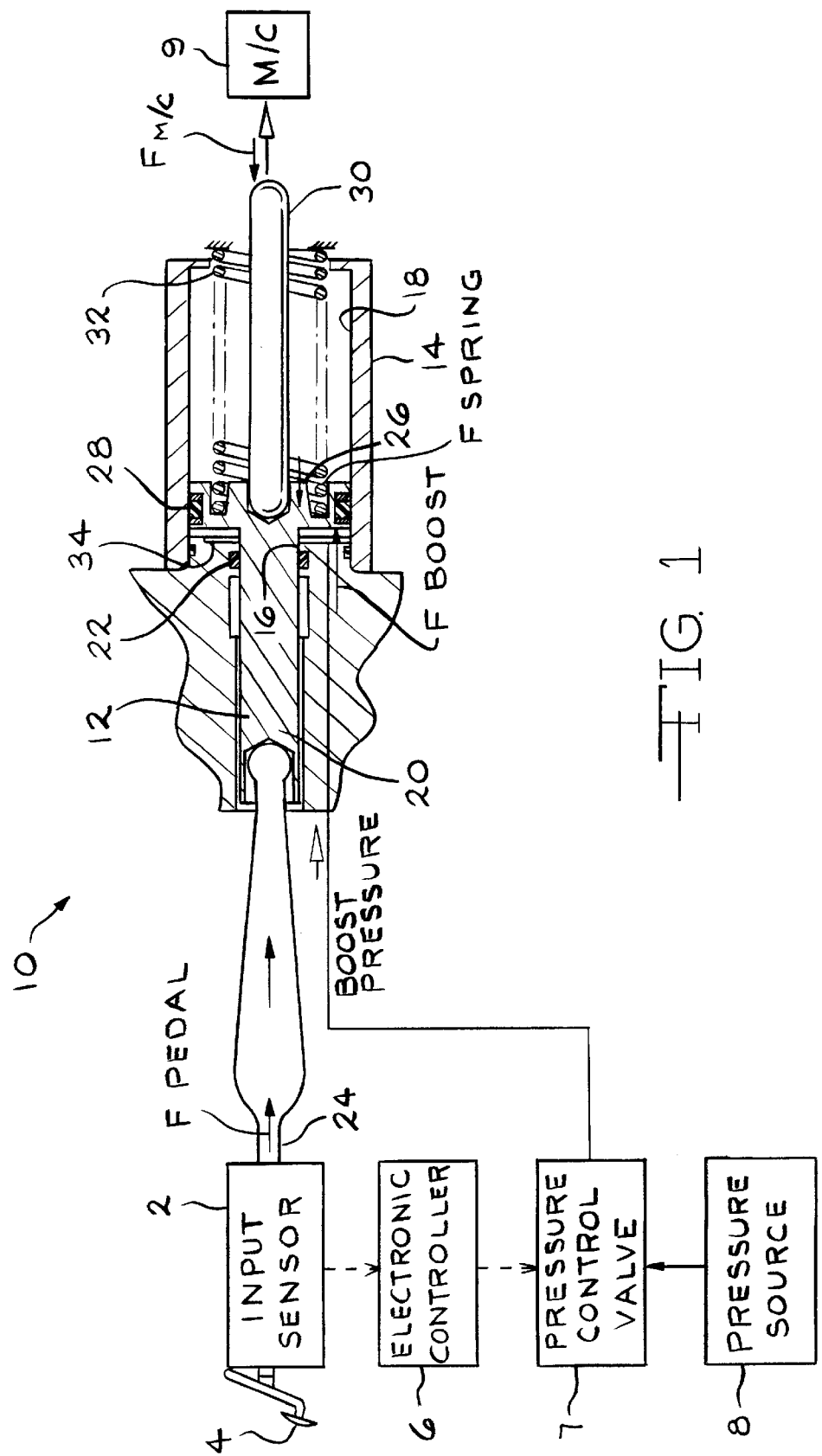
FIG. 1 is a schematic block diagram of one embodiment of the present invention.
Figure 2:
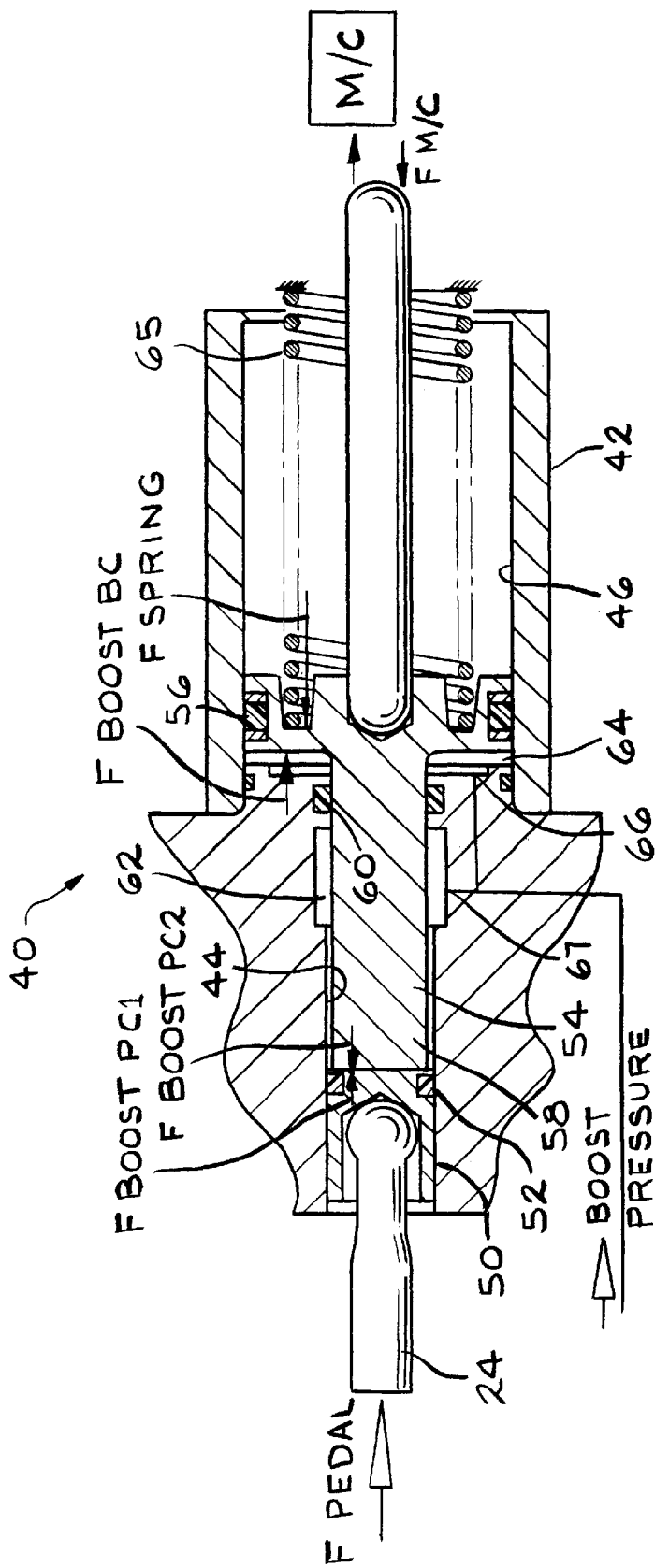
FIG. 2 is a schematic diagram of a second embodiment of the present invention.
Figure 3:
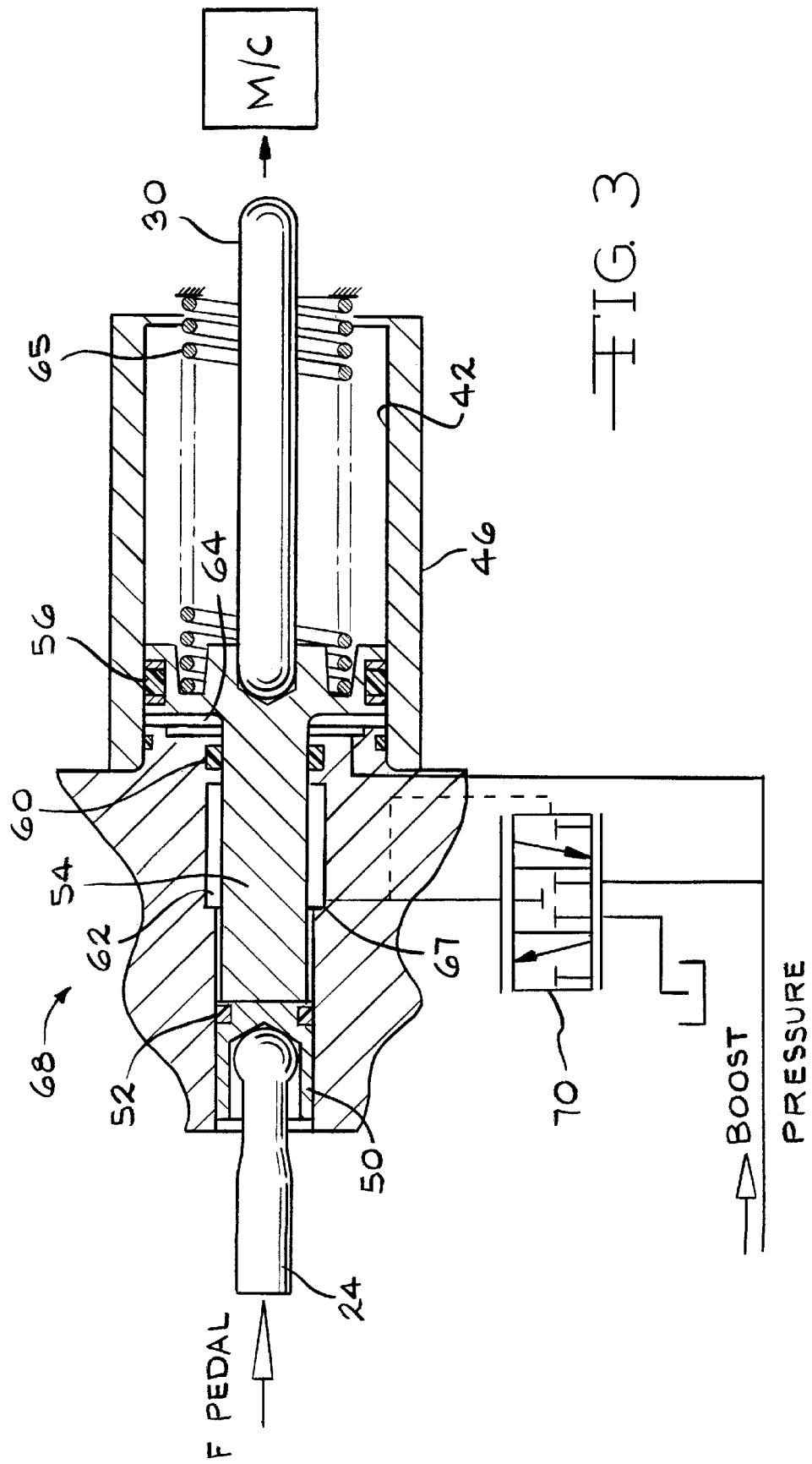
FIG. 3 is a schematic diagram of a third embodiment of the present invention.

Referring now to the drawings, there are illustrated in FIGS. 1 through 3 three embodiments of hydraulic brake boosters.

Each of the brake boosters illustrated in FIGS. 1 through 3 may be used with a standard brake system.

Each of the brake boosters features some sort of driver input sensor, which is illustrated schematically in FIG. 1 and indicated generally at 2. The drive input sensor 2 senses input of the operator through operation of a brake pedal 4. Suitably, either pedal travel or pedal force input may be sensed, depending on the specific piston configuration of the associated brake booster, as will be discussed below. Pedal travel may be sensed, for example, by repositioning of a rheostat coupled to the brake pedal 4. Pedal force, that is, the force applied by the operator on the brake pedal 4 may be sensed, for example, by a load cell which is incorporated into the brake apply force path. Of course, these examples of specific embodiments of the driver input sensor 2 are not intended to be limiting, and other driver sensors may be suitable for use as the driver sensor 2.

In each of the brake boosters, the signal developed by the drive input sensor 2 is supplied to an electronic controller 6. The electronic controller 6 controls the demand signal to a pressure control valve 7 based on the signal from the driver input sensor 2, if such a signal is present. Other signals may be supplied to the electronic controller 6 for purposes which will be discussed below.

The pressure control valve 7 regulates the pressure of a fluid provided under pressure from a pressure source 8. The pressure source 8 may be, for example, the vehicle's power steering pump in combination with a pressure building valve, or other source of pressurized hydraulic fluid. Thus, the pressure supplied to the brake booster is from the associated pressure control valve 7. Note that the brake boosters illustrated in FIGS. 1 through 3 do not depend on a supply of a differential pressure, which would require the use of a two-sided piston design. The operation of the brake boosters also does not depend on a trapped volume of fluid, as is known in some prior art designs, such as that shown in U.S. Pat. No. 4,007,665. Trapped volumes of fluid are susceptible to accumulation of pockets of air, which can adversely affect the performance of the brake booster.

Note that, although only illustrated in FIG. 1, the brake boosters illustrated in both FIGS. 2 and 3 will be provided with the input sensor 2, the brake pedal 4, the electronic controller 6, the pressure control valve 7, the pressure source 8, and a master cylinder 9.

In each of the brake boosters illustrated in FIGS. 1 through 3, the supply pressure is generated as a result of electronic actuation by the electronic controller 6 resulting in a demand to the associated pressure control valve 7. Because of this electronic control of the hydraulic brake, these brake boosters can easily be integrated into systems where the electronic control of brake boost is used for traction control, VSM, hill hold, theft protection, ABS enhancement, brake induced vehicular deceleration control, brake pedal travel control, and pedal feel characteristic tailoring.

FIG. 1 is a schematic diagram of a first boost piston assembly or brake booster 10, which has a single boost piston 12. The brake booster 10 has a tubular body 14, with a small diameter bore 16 which expands to a large diameter bore 18. The piston 12 has a first portion 20 which is reciprocal (able to be reciprocated) within the small diameter bore 16 and is sealed against the surface of the small diameter bore 16 by a seal 22. The first portion 20 of the piston 12 is coupled to the brake pedal 4 via an arm 24. The force exerted on the pedal 4 by the operator is directly related to but not equal to the force exerted by the arm 24 due to mechanical advantages in the linkages connecting the pedal 4 to the arm 24.

The piston 12 has a second portion 26 which is reciprocal within the large diameter bore 18, and is sealed against the surface of the large diameter bore 18 by a seal 28. The boost piston 12 is coupled to the actuating piston in the master cylinder 9 by a rod 30. The boost piston 12 is urged away from the master cylinder 9 by a spring 32. The boost pressure is ported into the interior of the body 14 of the brake booster 10 at a point which is always in communication with a chamber 34 about the boost piston between the seals 22 and 28.

The force balance equation for the brake booster 10, while neglecting any frictional forces, is:

$$F_{pedal} + F_{boost} = F_{M/C} + F_{springs}$$

where $F_{pedal}$=the force exerted by the arm 24 which is in direct relationship with the force exerted by the operator through the pedal 4 and linkage $F_{boost}$=the boost pressure multiplied by the annular area of the second portion 26 of the boost piston 12 about the first portion 20.

$F_{M/C}$=the pressure in the master cylinder 9 multiplied by the area of the master cylinder piston (not shown) acting on the rod 30

$F_{springs}$=the force exerted against the boost piston 12 by the boost piston spring 32 and other return springs (not shown), such as a brake pedal return spring and a master cylinder piston return spring In the brake booster 10, the force $F_{M/C}$ acting on the master cylinder 9 is equal to the sum of the pedal force $F_{pedal}$ and the boost force $F_{boost}$, minus the return spring forces $F_{springs}$. An increase in boost pressure, which increases $F_{boost}$, aids rather than resists movement of the arm 24 towards the master cylinder 9 as the brake pedal 4 is depressed by the operator. Therefore, a load cell or other force sensor is used as the driver input sensor 2 to indicate the vehicle driver's desired braking. Pedal force is measured rather than pedal travel. The configuration shown in FIG. 1, because of its design, gives the capability to control, with boost pressure, the pedal force versus vehicle deceleration and pedal travel. Pedal travel versus vehicle deceleration remains the same.

Referring now to FIG. 2, a boost piston assembly or brake booster 40 is illustrated schematically which is generally similar to the brake booster 10. The brake booster 40 has a tubular body 42, with a small diameter bore 44 which expands to a large diameter bore 46. A cylindrical input piston 50 is fitted within the tubular body 42 to be reciprocal within the small diameter bore 44. The input piston 50 is sealed against the surface of the small diameter bore 44 by a seal 52. The input piston 50 is coupled to the brake pedal 4 via the arm 24.

The brake booster 40 also has a boost piston 54 which is reciprocal within both the large diameter bore 46, and the small diameter bore 44. The boost piston 54 is sealed against the surface of the large diameter bore 46 by a seal 56. The boost piston 54 has a reduced diameter portion 58 which extends into the small diameter bore 44. A seal 60, which is fixed to the housing 42, seals against the reduced diameter portion 58 of the boost piston 54, thereby forming two separate pressure chambers: A pedal chamber 62 and a boost chamber 64. The seal 60 can be used to facilitate a manipulation of pressures in the chambers 62 and 64 for the purpose of pedal feel or failed power source operation, or can be optionally be left out. However, if the seal 60 is omitted, certain features which are described below would not be functional. The pedal chamber 62 extends between the seals 52 and 60 in the small diameter bore 44. The boost chamber 64 extends between the seals 56 and 60 in the large diameter bore 46. The boost piston 54 is coupled to the actuating piston in the master cylinder 9 by the rod 30. The boost piston 54 is biased away from the master cylinder 9 by a spring 65. The boost pressure is ported into the interior of the body 42 of the brake booster 40 at a first port 66 which is always in communication with the boost chamber 64, and at a second port 67 which is always in communication with the pedal chamber 62.

The force balance equation for the boost piston 54, while neglecting any frictional forces, is:

$$F_{piston} + F_{boost\ BC} + F_{boost\ PC1} = F_{M/C} + F_{springs}$$

where $F_{piston}$=the force acting directly from one piston to the other (pistons 50 and 54) (this force is zero when the pistons separate from one another)

$F_{pedal}$=the force exerted by the arm 24 which is in direct relationship with the force exerted by the operator through the pedal 4 and linkage $F_{boost\ BC}$=the boost pressure in the boost chamber 64 multiplied by the annular area of the boost piston 54 inside the boost chamber 64

$F_{boost\ PC1}$=the boost pressure in the pedal chamber 62 multiplied by the transverse cross sectional area of the reduced diameter portion 58 of the boost piston 54 inside the pedal chamber 62

$F_{M/C}$=the pressure in the master cylinder 9 multiplied by the area of the master cylinder piston (not shown)

$F_{springs}$=the force exerted by the boost piston spring 32 and other return springs (not shown), such as a brake pedal return spring and a master cylinder piston return spring The force balance equation on the input piston 50 is:

$$F_{pedal} = F_{piston} + F_{boost\ PC2}$$

where $F_{boost\ PC2}$=the boost pressure in the pedal chamber 62 multiplied by the cross sectional area of the input piston 50 inside the pedal chamber 62.

In the brake booster 40, an increase in boost pressure will increase the boost forces, $F_{boost\ BC}$ and $F_{boost\ PC1}$, acting on the boost piston 54. The force acting on the master cylinder 9 is the total of the boost forces acting on the boost piston 54 minus the return spring forces $F_{springs}$. The pressure built in the chamber 62 acts to separate the pistons 50 and 54. When $F_{boost\ PC2}$ matches $F_{pedal}$, and boost pressure continues to increase, the pistons 50 and 54 separate. As the brake boost pressure increases, the pedal 4 will become harder to depress due to increasing pressure in the pedal chamber 62. The configuration of booster 40, because of its design, allows for the control of pedal travel versus pedal force and vehicle deceleration by controlling the pressure. The pedal force versus vehicle deceleration remains the same (this relationship may be changed by changing the ratio of the diameters of the input piston 50 and the boost piston 54).

Referring now to FIG. 3, there is shown a schematic representation of a third embodiment of a boost piston assembly or brake booster, indicated generally at 68. The brake booster 68 is physically the same as the brake booster 40, but includes a valve 70 between the boost pressure control valve 7 (FIG. 1) and the pedal chamber 62. Alternatively, the valve 70 could be placed directly between the pressure source and the pedal chamber 62. The boost chamber 64 is supplied directly from the pressure control valve 7, bypassing the valve 70. The valve 70, in cooperation with the seal 60 between the pedal chamber 62 and the boost chamber 64 allows boost control independent of pedal force. The boost pressure is applied through the valve 70 to the pedal chamber 62 to act on the input piston 50, giving pedal effort feedback. The valve 70 allows control over the pressure in the pedal chamber 62 with respect to the boost pressure from the boost pressure control valve 7. The booster 68 has a configuration with which pedal travel, pedal force, and vehicle deceleration can all be controlled relative to each other by controlling the pressures in the two chambers 62 and 64.

Figure 4:
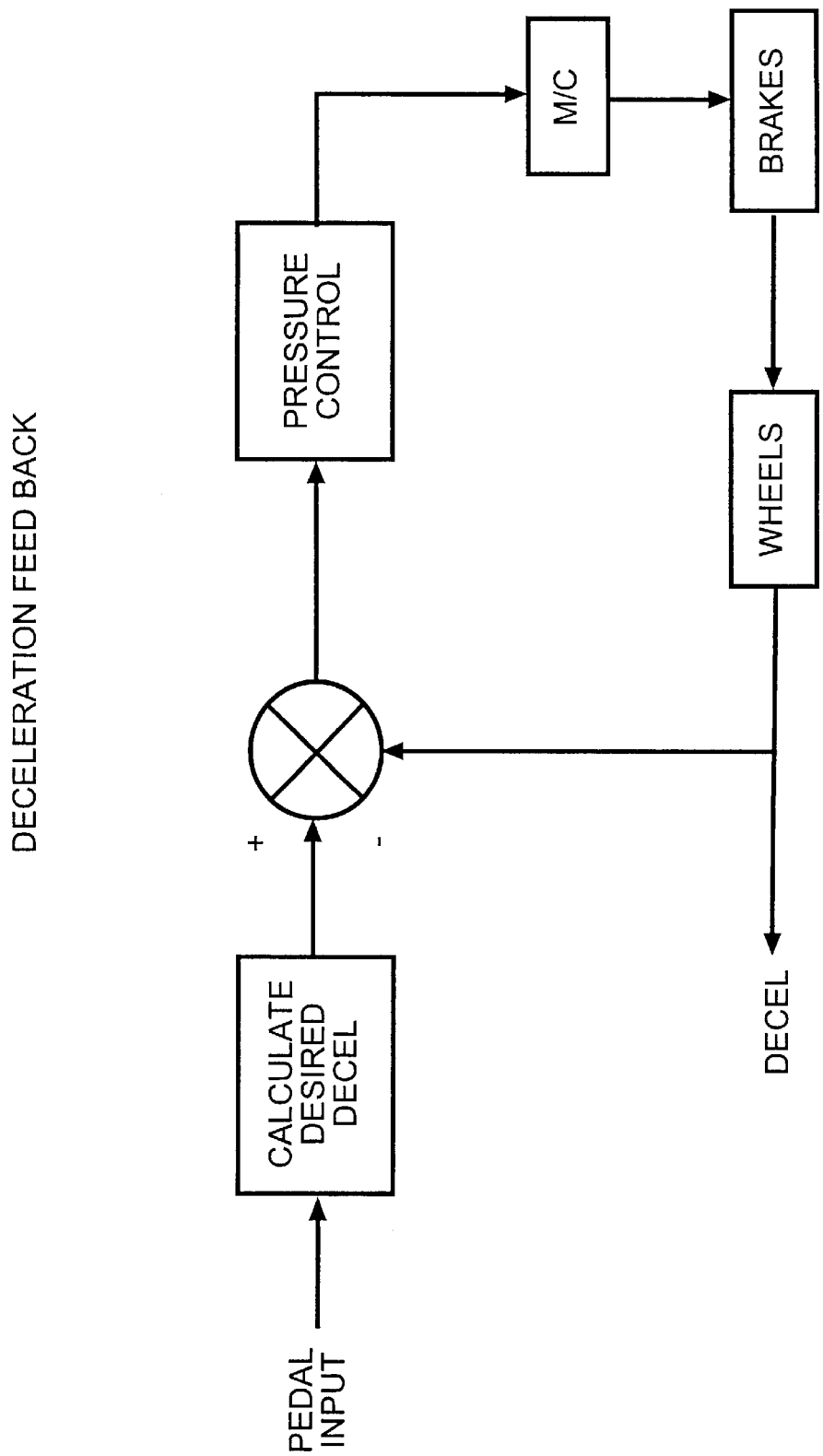
FIG. 4 is a schematic block diagram of a deceleration feedback loop.

With the embodiments shown in FIGS. 1 through 3, a method of brake induced vehicular deceleration control, schematically illustrated in FIG. 4, may be implemented in which the rate of vehicle deceleration is controlled, and is dependent on the pedal effort exerted or the travel input by the driver. The arrangement shown in FIGS. 1 and 2 would result in adverse pedal feedback with this type of control, whereas the arrangement in FIG. 3 would not. For example, brake induced vehicular deceleration control may be implemented by providing a sensor (not shown) for measuring vehicle deceleration, such as an accelerometer, or a wheel speed sensor which can be used to deduce the vehicle deceleration from the rate of change of wheel speed, such as that from an ABS (anti-lock brake system). The electronic controller 6 can use the driver input signal from the input sensor 2 to find an associated vehicle deceleration rate which is desired by the operator of the brake pedal. For example, the driver input signal can be compared to the sensed vehicle deceleration to develop an error signal which is used to adjust the control signal from the electronic controller 6 to the pressure control valve 7 is a manner to eliminate the error signal. The electronic controller produces a control signal to the pressure control valve 7 to produce a relatively uniform relationship between the pedal effort and deceleration which is relatively independent of such external factors such as travel of the vehicle up or down slopes, or the load carried by the vehicle. For example, when the vehicle is heavily loaded with cargo, the total mass which must be slowed by the vehicle brakes is increased. The deceleration (or negative acceleration) of the vehicle will be lower when the mass is high compared to deceleration achieved when the mass is less for the same braking force applied by the vehicle brakes, due to the well known relationship between force, mass, and acceleration (F=ma). Therefore, the deceleration will tend to be lower for the same pedal input by the operator of the vehicle when the mass is higher. If the deceleration rate is too low, the pressure control valve 7 can be generally signaled to cause the pressure supplied to the associated brake booster to increase, increasing the force exerted by the brake booster on the associated master cylinder 9, increasing the braking force on the vehicle, and increasing the rate of deceleration to match that demanded by the operator.

The deceleration feedback information sensed by the vehicle deceleration sensor may be filtered through a standard filter circuit. Suitably, the controller directing the positioning of the pressure control valve may include (or receive an input from) any of several well-known ABS controllers. Such controllers may already be present to provide anti-lock braking for the vehicle, and are capable of sampling wheel speeds from which the electronic controller computes the deceleration data at a predetermined rate. For example, the controller may obtain one sample for each background loop of the electronic controller. Other types of deceleration sensors may be used instead if desired; for example, a direct deceleration sensor.

Brake induced vehicular deceleration is controlled in the brake booster 10, as shown in FIG. 1, by monitoring the relationship between the pedal force versus the deceleration of the vehicle. The pedal force is measured and a control signal is developed to increase or decrease the boost pressure based on the measured pedal force. Brake induced vehicular deceleration is controlled in the brake booster 40, as shown in FIG. 2, by monitoring the relationship between the pedal travel versus the deceleration of the vehicle. The pedal travel is measured and a control signal is developed to increase or decrease the boost pressure based on the measured pedal travel. For example, the pressure experienced by the motorist to get a desired deceleration rate will be higher where the mass of the vehicle is large due to being heavily laden with cargo or passengers compared to the mass of the vehicle without cargo or passengers. However, the operator will not have to push to any different pedal travel to generate the same desired deceleration rate, and the pedal force will not be different than the former case shown in FIG. 1.

Brake induced vehicular deceleration is controlled in the brake booster 68, as shown in FIG. 3, by monitoring the relationship between the pedal travel versus the deceleration of the vehicle. Electronic modification of pedal force, travel, and vehicle deceleration characteristics, including brake induced vehicular deceleration control, is possible by electronic control of the boost pressure control valve 7 and the valve 70. By independently controlling the pressure of the pedal chamber 62 and boost chamber 64, system characteristics such as vehicle deceleration versus travel of the brake pedal 4, or vehicle deceleration versus force exerted on the brake pedal 4 can be controlled. The brake booster 68 can control the travel length of the brake pedal 4, so that the brake operator depresses the pedal 4 at the same travel and get the same pedal force for the same deceleration rate, regardless of the load carried by the vehicle or if the vehicle is traveling up or down slopes. The travel versus pedal force of the pedal 4 is controlled by controlling the pressure in the pedal chamber 62 by valve 70.

In either of the brake booster 40 shown in FIG. 2 and the brake booster 68 shown in FIG. 3, the pedal force versus deceleration relationship can be modified by changing boost pressure and boost piston areas or just the piston areas.

A more specific example of a scheme for deceleration feedback is illustrated in FIG. 5. A vehicle hydraulic brake system is schematically diagrammed generally at 200. The brake system includes a brake pedal 214 providing operator force input to a boost piston assembly 216. The boost piston assembly 216 operates a master cylinder 218, and through the master cylinder 218, applies a pressure to the brakes 220, which engage the wheels 224. A load cell 204 monitors pedal effort, and provides an electrical signal to a valve control 238 (which is similar in function to the electronic controller 6 illustrated in FIG. 1). The valve control 238 can also receive input from sources other than or in addition to the load cell 204. For example, the valve control 238 can receive an input from a deceleration feedback circuit, such as that illustrated in FIG. 5. In this arrangement, pedal effort is distributed through function flow line 210 to the boost piston assembly 216, which is functionally illustrated as a summing point. Pedal effort is distributed as an input signal for the valve control 238. The boost pressure control valve 234 acts under the control of the valve control 238 to develop a boost pressure applied to the boost piston of the boost piston assembly 216, which causes a force to be exerted on the boost piston which is illustrated as the function flow line 212. The resulting pressure developed by master cylinder 218 is distributed to the brakes 220, which actuate to slow the associated wheels 224. Deceleration can be calculated by the valve control 238 using wheel speed information distributed to the valve control 238 through a function flow path 217. By differentiating the wheel speed data, the valve control 238 produces a control signal to the boost control valve 234 that takes into account the vehicle deceleration to produce a relatively uniform relationship between pedal effort and deceleration which is relatively independent of such external factors such as travel of the vehicle up or down slopes, or the load carried by the vehicle.

The feedback information distributed through function flow path 217 may be filtered through a standard filter circuit. The valve control 238 may include any of several well-known ABS controllers that are capable of sampling wheel speeds from which the valve control 238 computes the deceleration data at a predetermined rate; for example, one sample for each background loop of the valve control 238. Other types of deceleration sensors may be used instead if desired; e.g., a direct deceleration sensor.

In either of the brake booster 40 shown in FIG. 2 and the brake booster 68 shown in FIG. 3, an additional travel limiting valve (not shown) can be added to regulate flow to and from the pedal chamber 62. Similar control can be provided by modifying the valve 70, which is already in that position in FIG. 1. This arrangement would permit the travel of the brake pedal 4 to be limited in runout and failed power steering conditions, since flow of hydraulic fluid exiting the pedal chamber 62 could be controlled. For example, under certain braking operating conditions the input piston 50 would be separated by a distance from the boost piston 54, due to the pressure in chamber 62. During a "power runout", the input piston 50 would have to travel until contact was made with the boost piston 54 for direct manual braking, that is, a direct mechanical linkage from the arm 24 to the master cylinder connection rod 30. "Power runout" occurs when the force exerted on the input piston 50 from the pedal 4 exceeds the maximum force capability of the hydraulic system acting on the other side of the input piston 50. To prevent the input piston 50 from traveling the separation distance, the additional travel limiting valve (not shown) or the valve 70 can be modified to trap the hydraulic fluid in the pedal chamber 62. Thus, mechanical actuation of the input piston 50 by pedal 4 will hydraulically actuate the boost piston 54 to supply pressure to the master cylinder 9.

Finally, it will be appreciated that electronic control of the valve 70 of FIG. 3 (or of the pressure control valve 7 shown in FIG. 1) allows the sampling of the brake pedal 4 to be controlled and adjusted according to various software instructions.

Figure 6:
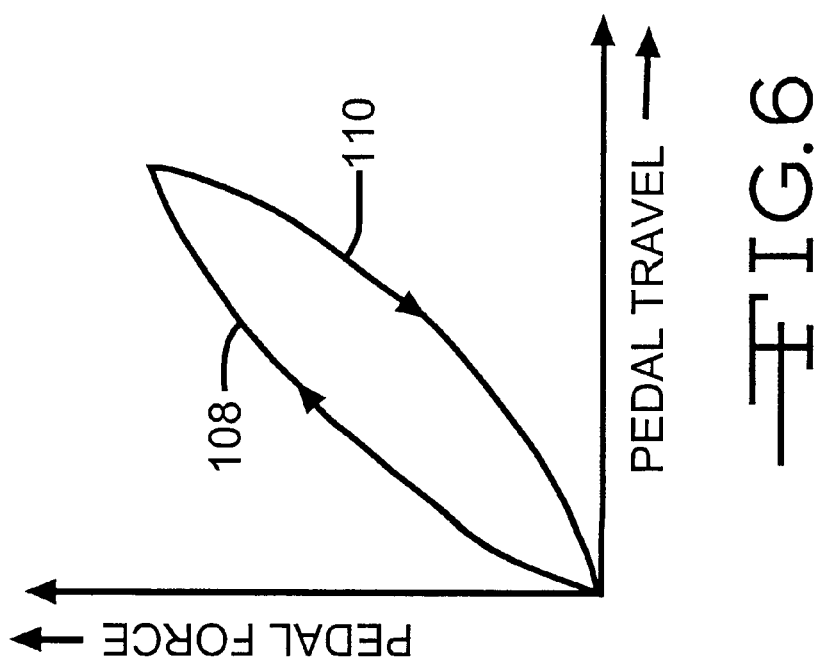
FIG. 6 is a graph illustrating pedal force versus pedal travel.

In the brake boosters 40 and 69 described above and shown in FIGS. 2 and 3, respectively, the controller 6 can reduce the boost pressure to reduce the pedal force on the return stroke. This will also reduce the brake pressure and make the brake system more responsive. Similarly, the pressure can be applied more quickly on the apply stroke in any of the brake boosters 10, 40, or 68 described above. This can be done by using the pedal velocity (which can be calculated in the electronic controller 6 from indications of pedal travel versus time) as an input to a control algorithm such that the higher the pedal velocity, the greater the changes in boost pressure. In this way, a damping characteristic can be introduced to the pedal feel, as shown in FIG. 6. As shown by the line 108, the pedal force can be made to rapidly increase in the initial stages of movement from the undepressed position toward a fully depressed position. Because of the damping characteristic, the pedal force can be made to rapidly decrease during the initial stages of movement from the fully depressed position to the undepressed position when the brake pedal 4 is released, as shown by the line 110.

Figure 8:
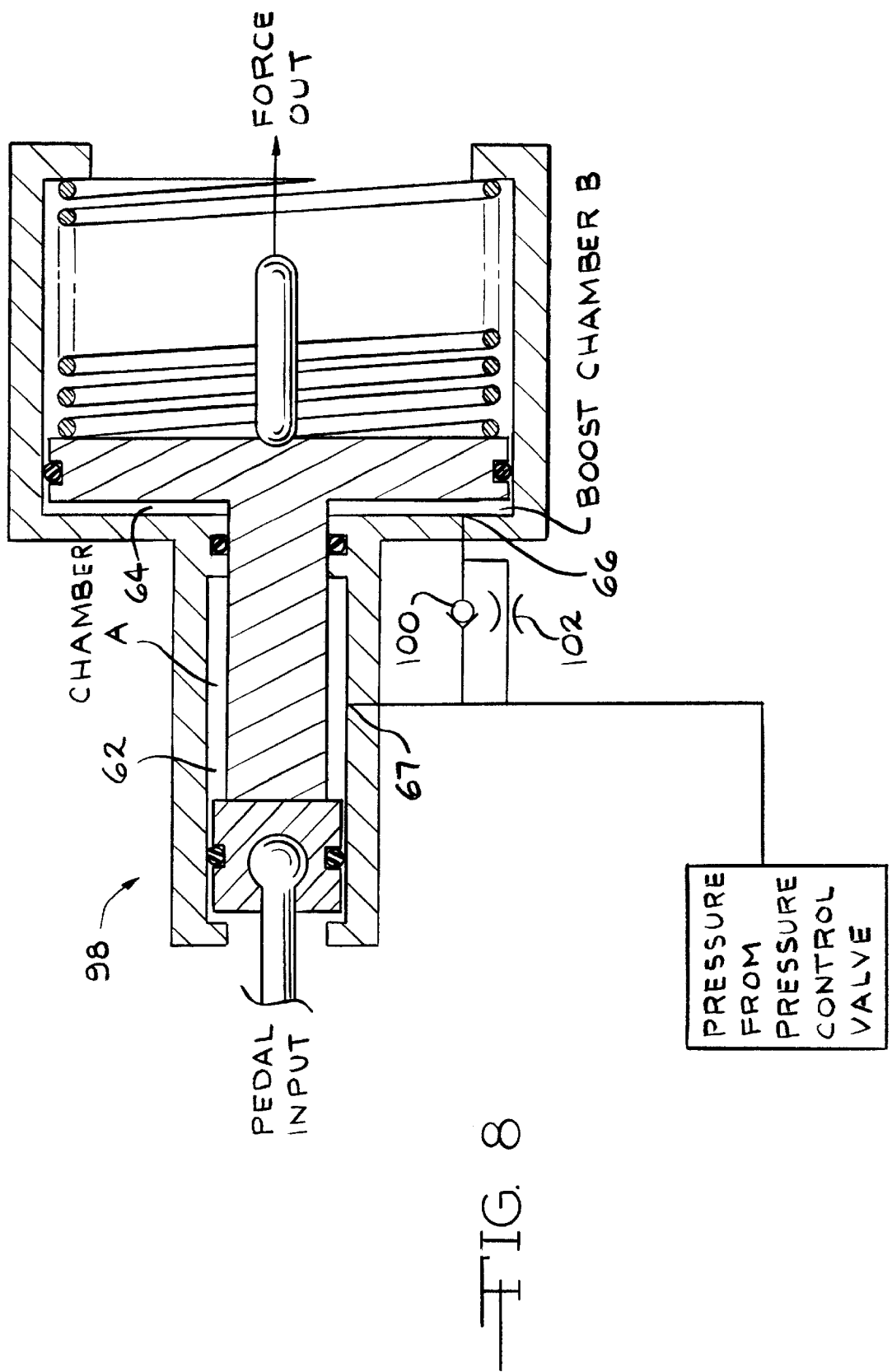
FIG. 8 is a schematic diagram of a further embodiment of the present invention.

Another arrangement for providing pedal damping is illustrated in FIG. 8, which is a schematic representation of a brake booster 98. The brake booster 98 is constructed identically to the brake booster 40 illustrated in FIG. 2. In this embodiment, however, a check valve 100 is provided between the pressure control valve and the port 66 which admits hydraulic fluid into the boost chamber 64, but will not allow flow back out through the check valve 100. Instead fluid flow out of the boost chamber 64 through the port 66 is directed through an orifice 102.

Figure 7:
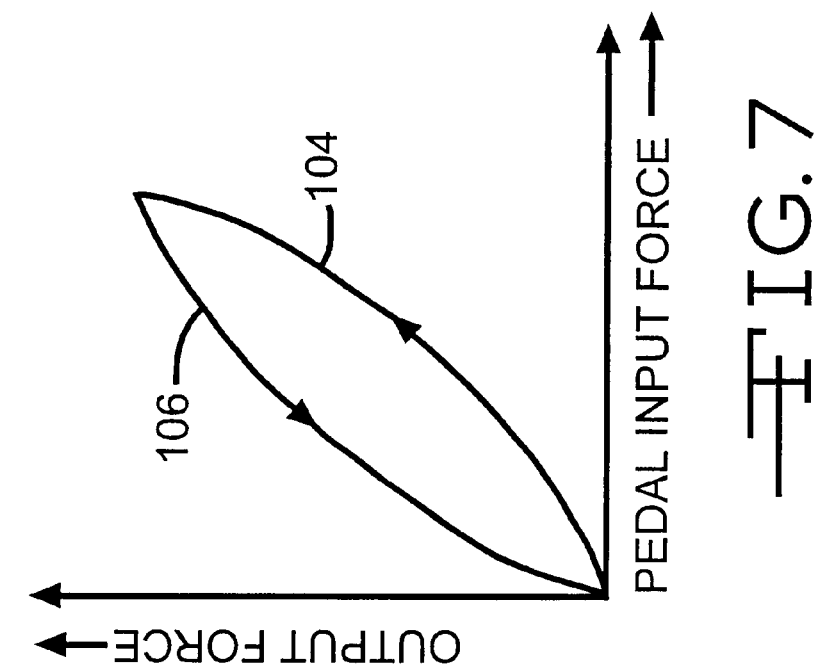
FIG. 7 is a graph illustrating output force versus pedal input force.

With the described arrangement, the pressure in the pedal chamber 62 and the boost chamber 64 will both rise rapidly to the same pressure when the brake pedal is actuated to increase the pressure out of the pressure control valve. This operation is illustrated by the upward trending line 104 on the pedal input force versus output force graph shown in FIG. 7.

When the brake pedal 4 is released, the pressure in the pedal chamber 62 will rapidly decrease by venting fluid out of the port 67 back to the pressure control valve. However, since the flow out of the boost chamber 64 is restricted by the orifice 102, the pressure in the boost chamber 64 will not decrease as fast as the pressure in the pedal chamber 62. This holds off the brake force from the brake pedal 4. This situation is illustrated by the downward trending line 106 on the pedal input force versus output force graph shown in FIG. 8. The lines 104 and 106 of FIG. 8 form a hysteresis loop. Such a hysteresis loop is a characteristic of a standard (non-electrically controlled) vacuum brake booster. Operating the brake booster 98 with this hysteresis loop causes the operator to feel that the operation of the brake system is like the operation of a standard vacuum brake system, as the operator expects. As FIG. 8 shows, as the pedal force decreases, the force to the master cylinder decreases more slowly, causing the braking pressure to reduce more slowly as well.

Either of the second and third brake booster embodiments 40 and 68, shown respectively in FIGS. 2 and 3, can be configured such that the pedal chamber (i.e., the chamber formed in the reduced diameter bore 44) is a trapped volume. This would provide the brake pedal 4 with a fixed travel ratio. Also, the driver input sensor 2 in this arrangement could be a pedal force input, as described above, or a pressure sensor 2 sensing the pressure developed in the pedal chamber as the operator depresses the brake pedal 4 of the vehicle.

Figure 9:
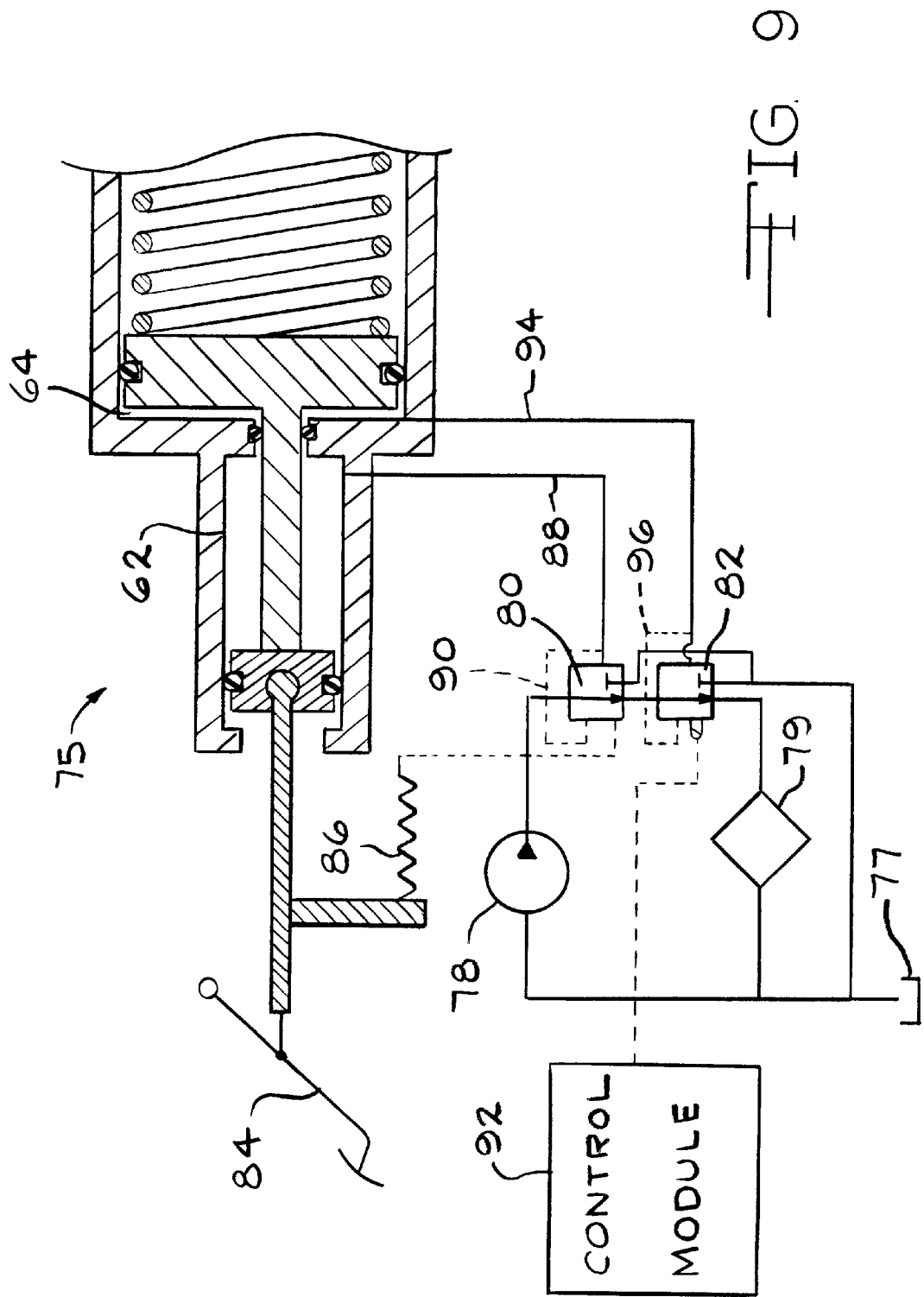
FIG. 9 is a schematic diagram of yet a further embodiment of the present invention.

It should be realized that the pressure control valves supplying the pedal chamber and boost chamber could be mechanically or electronically actuated, or any combination. For example, a potential embodiment of a pressure supply for a boost piston assembly or brake booster, indicated generally at 75, is shown in FIG. 9. The brake booster 75 is illustrated as being connected to a power steering system including a reservoir 77, a pump 78 drawing hydraulic fluid from the reservoir 77 and pumping it to a power steering valve 79, from which the hydraulic fluid returns to the reservoir 77. Between the pump 78 and the power steering valves 79 are two pressure control valves 80 and 82. Fluid from the power steering pump flows through the pressure control valve 80 and the pressure control valve 82 to the power steering valve 79. Both of the pressure control valves 80 and 82 are connected to a fluid conduit to enable control of boost pressure down to zero pressure, rather than down to the pressure upstream of the power steering valve 79, which may be considerably higher than zero pressure.

The pressure control valve 80 is mechanically linked to a brake pedal 84 through a spring 86. Depressing the brake pedal 84 causes the valve 80 to increase the pressure in an output pipe 88. As denoted by the dashed line 90, the pressure in the output pipe 88 is fed back to the valve 80 so that the pressure in the output pipe 88 will come up to a steady state value determined by the mechanical input from the brake pedal 84. The pressure control valve 80 may alternatively be electrically actuated by a control module 92 based on an electric signal indicative of the position of or force exerted on the brake pedal 84.

The pressure control valve 82 is also located between the pump 78 and the power steering valves 79. The valve 82 is electrically positioned by the control module 92. Alternatively, the pressure control valve 82 may be mechanically positioned by the brake pedal 84 similarly to the pressure control valve 80 described above. Actuation of the valve 82 raises the boost pressure applied to the brake booster 75 by way of a pipe 94. As denoted by the dashed line 96, the pressure in the output pipe 94 is fed back to the valve 82 so that the pressure in the output pipe 94 will come up to a steady state value determined by the electrical input (excitation) from the control module 92.

The physical structure of the brake booster 75 is identical to that of the brake booster 40 illustrated in FIG. 2. The pipe 88 is connected to the pedal chamber 62 of the brake booster 75 through the port 67. The pipe 94 is connected to the boost chamber 64 through the port 66.

With the pressure control valve 80 providing pressure up to the pedal chamber 62 of the brake booster 75, a pedal effort feedback is provided in such a way that the valve 80 continues to pressurize the brake booster 75 until a desired pressure is reached in the pedal chamber 62. Note that the pressure in the pedal chamber 62 is the same pressure in the line 88, to which the pressure feedback pipe 90 is attached. This pressure will be reached regardless of whether air is accumulated in the pedal chamber 62. Similarly, the pressure in the boost chamber 64 will also be reached regardless of whether air is accumulated in the boost chamber 64. In contrast, in a trapped design, configurations that trap fluid in the pedal chamber 62 to provide pedal effort feedback may be degraded by accumulated air forming air pockets in the pedal chamber 62. Performance degrades because the accumulated air pockets are more compressible than the hydraulic fluid that the system is designed to have in the pedal chamber 62.

It should be noted that the flow of fluid diverted to the brake booster 75 during pressurization of the brake booster 75 will normally be only a small fraction of the fluid flowing from the pump 78 to the pressure control valve 80. The remainder of the fluid being pumped by the pump 78 continues to flow through the valve 80 to the valve 82. When the brake pedal 84 is released, the pressure control valve 80 directs the full flow of fluid from the pump 78 to the control valve 82, while simultaneously venting fluid from the pedal chamber 62 to the reservoir 77 through a separate vent pipe.

Similarly, the pressure control valve 82 will continuously direct fluid flow from the pump 78 which comes through the pressure control valve 80 to the power steering valve 79. If it is desired to raise boost pressure in the boost chamber 64, the pressure control valve 82 directs a small portion of the fluid flow to the boost chamber 64. If the back pressure from the steering valve 79 is less than the desired boost pressure, the pressure control valve 82 will close slightly to throttle the flow to the power steering valve, and raise the pressure of the fluid flowing into the pressure control valve 82 and thus the pressure of the fluid being directed to the boost chamber 64. The pressure control valve 82 can vent fluid from the boost chamber 64 to the reservoir 77, through a separate vent line, to reduce the boost pressure to zero while still maintaining fluid flow to the power steering valve 79, even if the back pressure from the power steering valve 79 is greater than zero.

Figure 10:
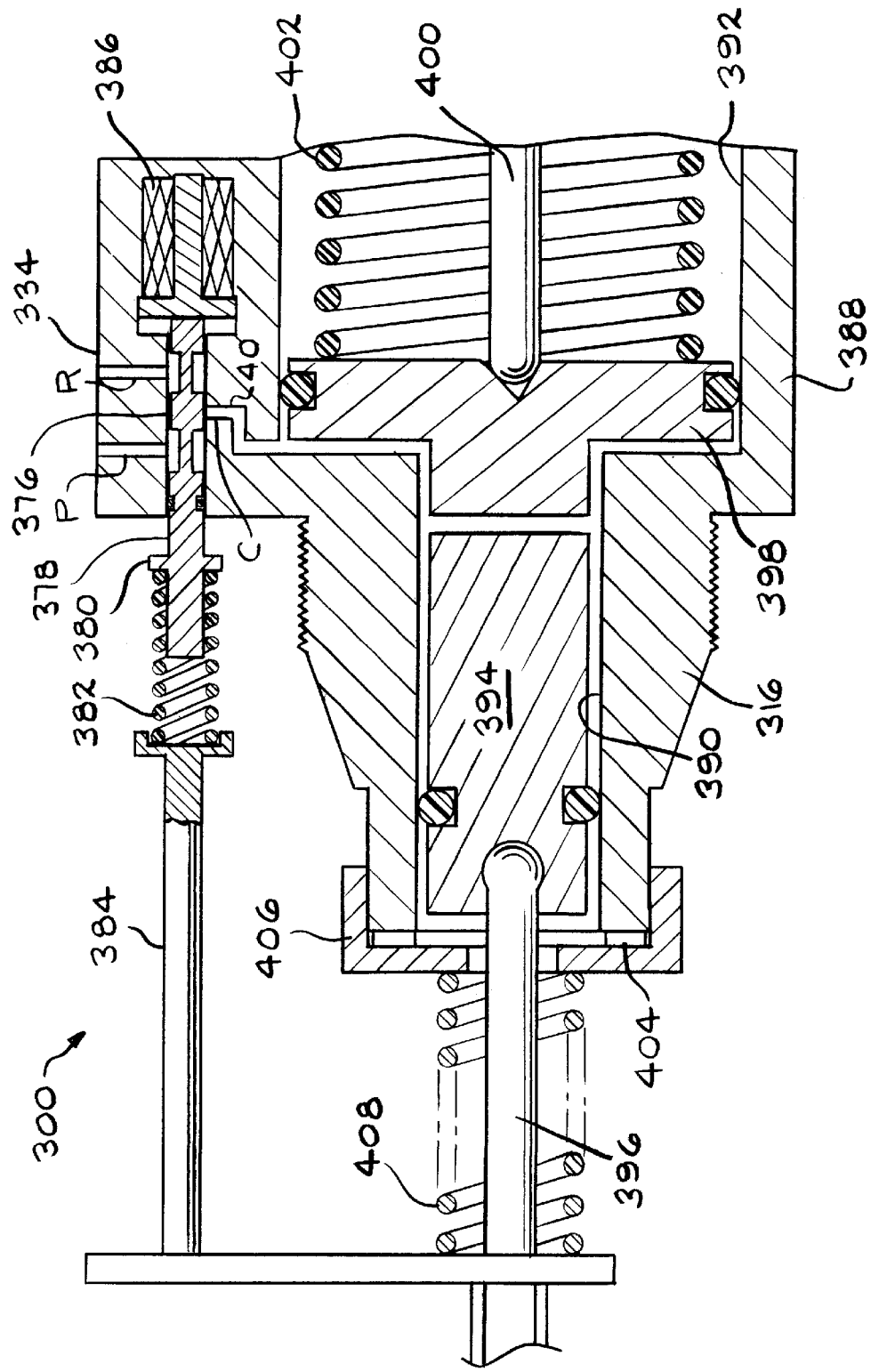
FIG. 10 is a schematic diagram of yet a further embodiment of the present invention.

FIG. 10 is a schematic illustration of an embodiment of a boost piston assembly, indicated generally at 300, which has a boost pressure control valve 334 which can be mechanically or electrically actuated, as described above. A valve spool 376 of this embodiment of the boost pressure control valve 334 has a stem 378 on the left hand end thereof (as viewed in FIG. 10) which extends out of the valve body of the boost pressure control valve 334. A flange 380 is formed on the stem 378, and is engaged by a spring 382. The spring 382 can be depressed against the flange 380 by an arm 384 mechanically linked to the pedal 14 (FIG. 1).

The right hand end of the spool 376 is operatively coupled to a solenoid 386. Thus, the spool 376 can be operated either mechanically only, through movement of the arm 384, or electrically only, through energization of the solenoid 386, or in combination to achieve a desired boost pressure in the port C, which is transmitted through the fluid conduit 340 to the boost piston assembly 316.

The boost piston assembly 316 shown in FIG. 10 has a tubular body 388, with a small diameter bore 390 which expands to a large diameter bore 392. An input piston 394 is reciprocal within the small diameter bore 390 and is sealed against the surface of the bore 390. The input piston 394 is coupled to the brake pedal via an arm 396. The arm 396 is coupled to the arm 384 for coextensive parallel movement.

A boost piston 398 is reciprocal within the large diameter bore 392, and is sealed against the surface of the bore 392. The boost piston 398 is coupled to the piston in the master cylinder 9 (FIG. 1) by a rod 400. The boost piston 398 is biased by a spring 402 away from the master cylinder 9. The fluid conduit 340 is ported into the interior of the body 388 of the boost piston assembly 316 between the input piston 394 and the boost piston 398.

A sensing element 404, such as a load cell which is shown indicating pedal travel, is positioned on the body 388 adjacent the opening through which the arm 396 extends. A collar 406 engages the sensing element 404 and is compressed against the sensing element 404 by a spring 408 which is compressed when the arm 396 is moved to urge the input piston 394 toward the boost piston 398, when the brake pedal 14 is depressed. The travel of the brake pedal 14 by the operator is proportional to the force exerted on the sensing element 404 by the spring 408 (acting through the collar 406). Thus the signal generated by the sensing element 404 can be used by electronic circuitry of the valve control (such as the electronic controller 6 of FIG. 1) to control the solenoid 386. If this is the sole input used, the mechanical actuation through arm 384 and the electrical actuation through the solenoid 386 would be acting in unison to position the valve spool 376 to a desired position. Note that additional inputs to the electronic controller that could be used to control the solenoid 386 include inputs from traction control systems, vehicle stability control, and collision control, for example, which may require employment of the brakes without the driver actually pushing on the brake pedal.

In the event of an electrical failure, the mechanical actuation through the arm 384 could still position the spool 376 to the appropriate position to achieve a desired boost pressure.

Figure 11:
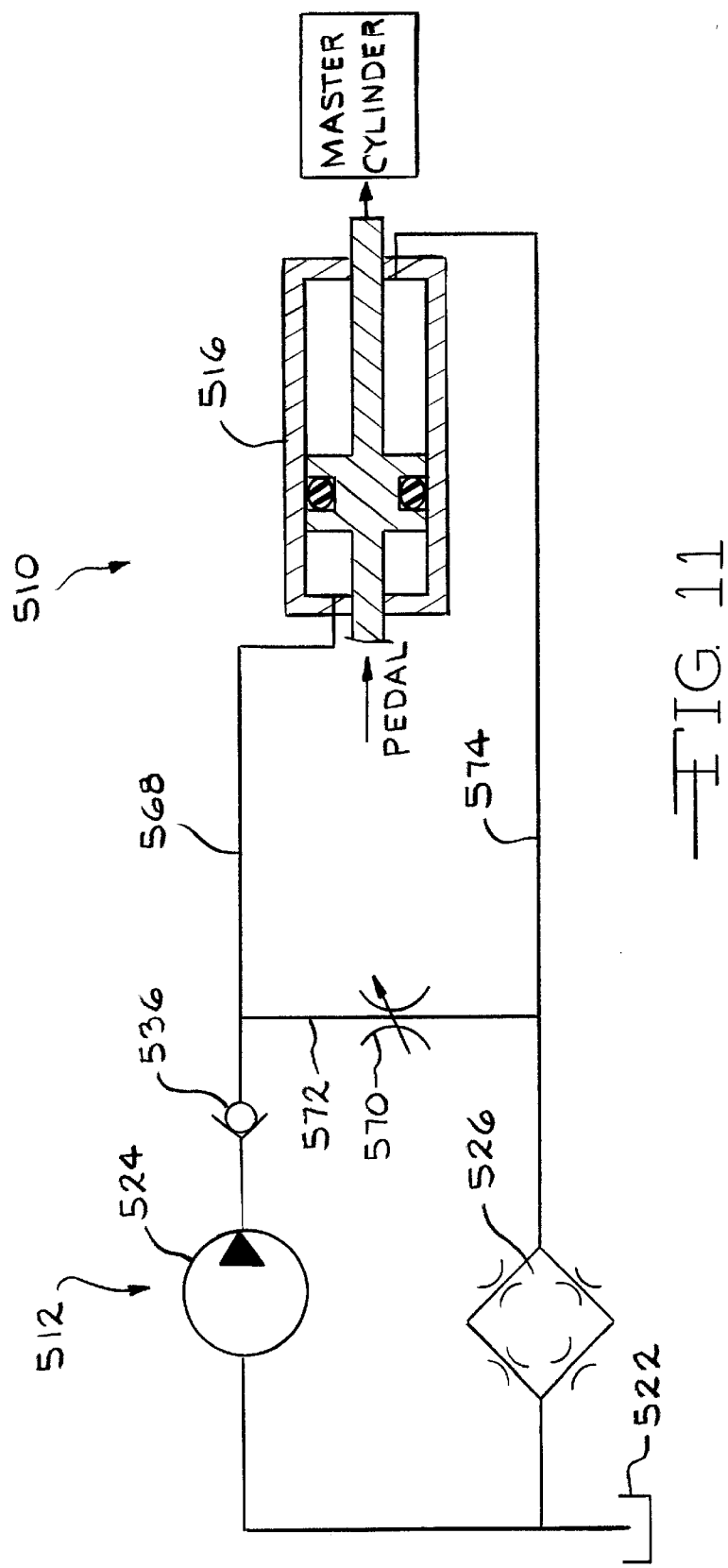
FIG. 11 is a schematic diagram of yet a further embodiment of the present invention.

FIG. 11 is a schematic illustration of a brake system 510 and power steering system 512, in which a pump, 524, or other fluid power source, discharges through a check valve 536. The check valve 536 is connected to a brake booster piston assembly 516 through a fluid conduit 568 and to a boost pressure control valve 570 through a fluid conduit 572.

The boost piston assembly 516 is a two-sided piston design. One side of the boost piston thereof has boost pressure applied at varying pressures, according to the position of the boost pressure control valve 570. The other side of the boost piston is vented to the power steering system 512 downstream of the boost pressure control valve 570, through a fluid conduit 574. The boost pressure is the differential pressure across the boost pressure control valve 570. Opening the boost pressure control valve 570 decreases the differential pressure across the boost pressure control valve 570, and thus across the boost piston of the boost piston assembly 516. Similarly, partially closing the boost pressure control valve 570 raises the boost pressure.

Preferably, the boost pressure control valve 570 is proportionally controlled by an electrical solenoid, but may be mechanically actuated, or other wise suitably actuated. The electronic controller (not shown) of the boost pressure control valve 570 may suitably receive an electronic feedback signal representative of the hydraulic pressure developed by the associated boost pressure control valve 570. Such an arrangement may be also suitable for the electronic controllers discussed above, such as the electronic controller 6. It should also be recognized that the boost pressure control valve 570 may be provided with a pressure feedback hydraulic conduit which acts on the valve in combination with the solenoid so that the pressure developed by the boost pressure control valve 570 will seek a steady state value determined by the excitation of the controller, similar to the pressure control valve 82 discussed above.

If there is a loss of flow from the pump 524 due to failures such as a malfunction of the pump 524, or stalling of the engine powering the pump 524, the check valve 536 and the boost pressure control valve 570 shut to trap the hydraulic fluid and pressure in the fluid conduit 572.

Figure 12:
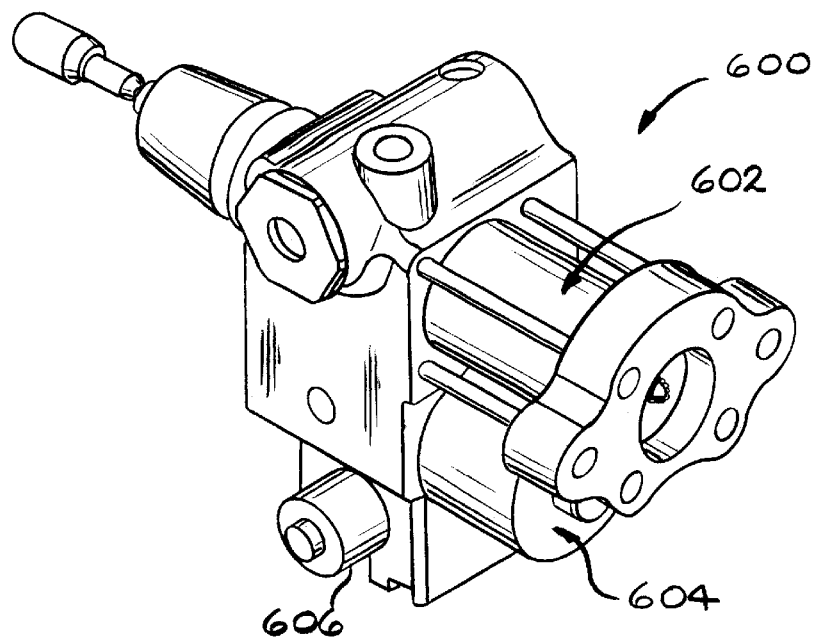
FIG. 12 is a perspective view of an integrated body 600 implementing the braking system of the present invention.

FIGS. 12 through 26 illustrate an embodiment of an integrated body, indicated generally at 600, which houses a hydraulic system in accordance with this invention. FIG. 12 is a perspective view of the integrated body 600. FIGS. 13, 14, 15, and 16 are front, right side, left side, and bottom elevational view, respectively, of the integrated body 600. The integrated body 600 generally includes a brake booster assembly 602, a pressure control valve 604, a travel limiting valve or a travel limit isolation valve 606, a back pressure valve 608, a filter 610, and a check valve 611.

Figure 13:
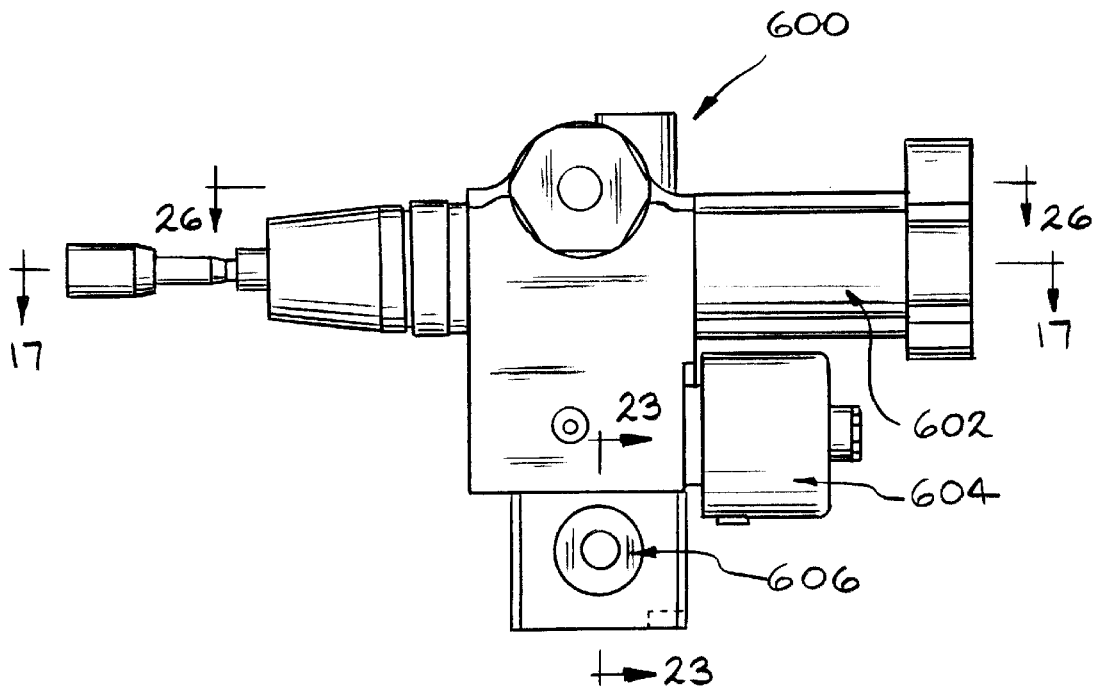
FIG. 13 is a front view of the embodiment of the present invention shown in FIG. 12.
Figure 21:
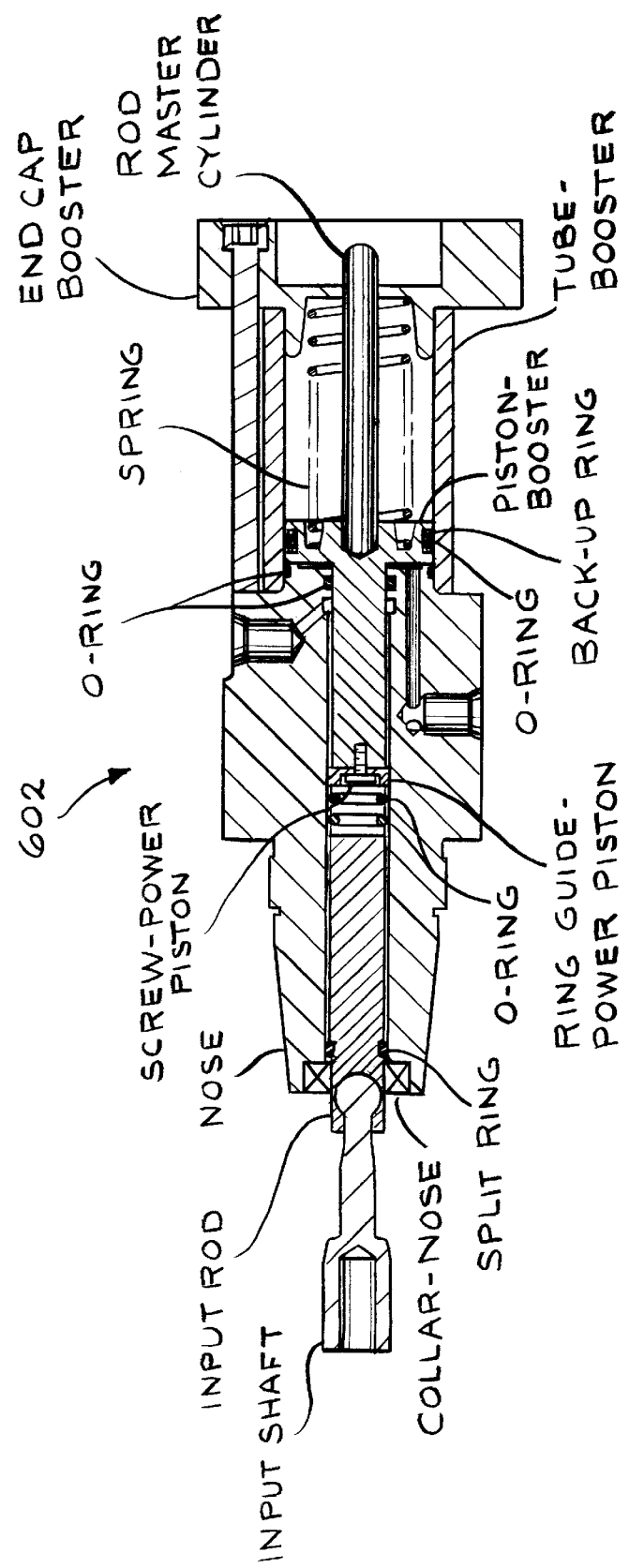
FIG. 21 is a sectional view of the brake booster assembly 602 taken along the lines 21—21 of FIG. 20.

FIG. 17 is a sectional view of the integrated body 600 taken along lines 17—17 of FIG. 13, showing the brake booster assembly 602. FIGS. 18, 19 and 20 are top, left side, and right side elevational views, respectively, of the brake booster assembly 602. FIG. 21 is a sectional view of the brake booster assembly 602 taken along lines 21—21 of FIG. 20.

Figures 14, 15:
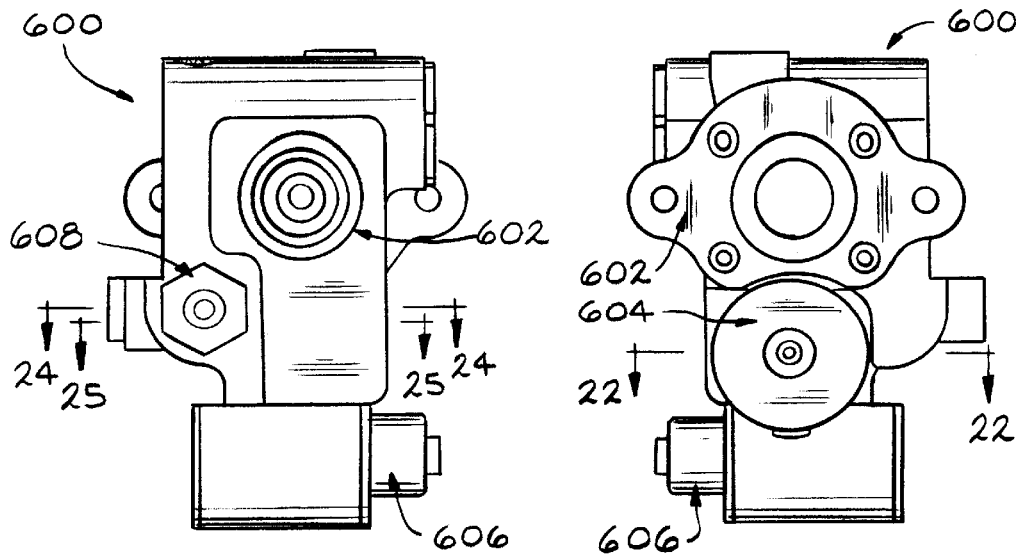
FIG. 14 is a right side view of the embodiment shown in FIG. 12.
FIG. 15 is a left side view of the embodiment shown in FIG. 12.
Figure 16:
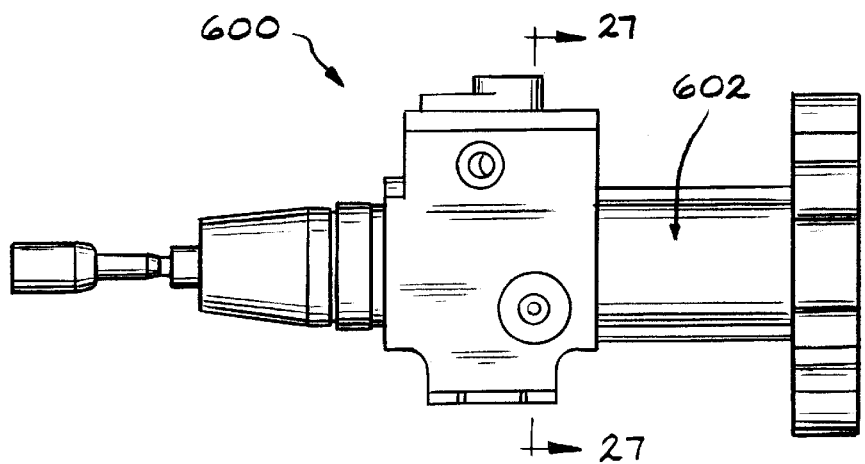
FIG. 16 is a bottom elevational view of the embodiment shown in FIG. 12.
Figure 22:
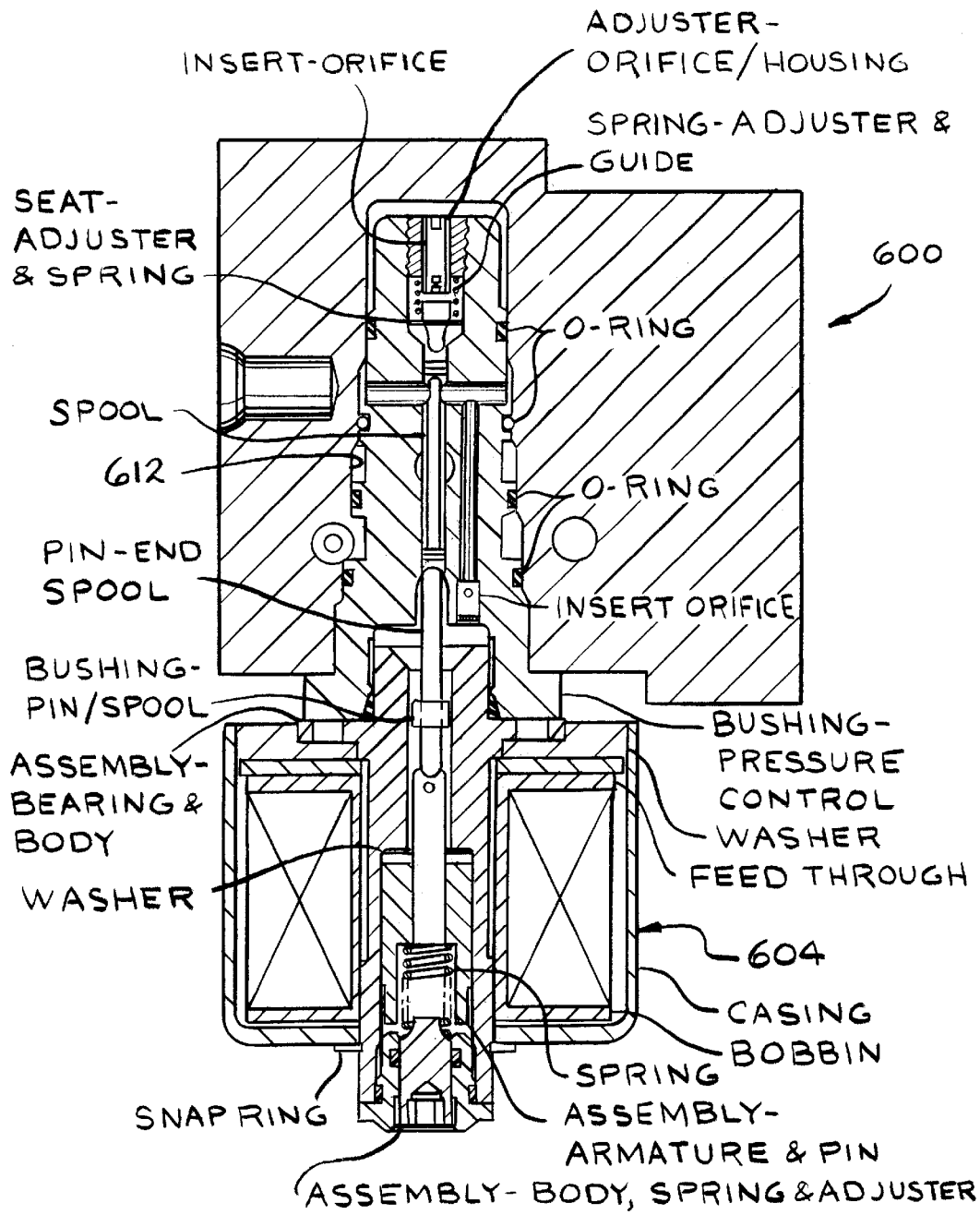
FIG. 22 is a sectional view of the integrated body taken along the lines 22—22 of FIG. 14.
Figure 23:
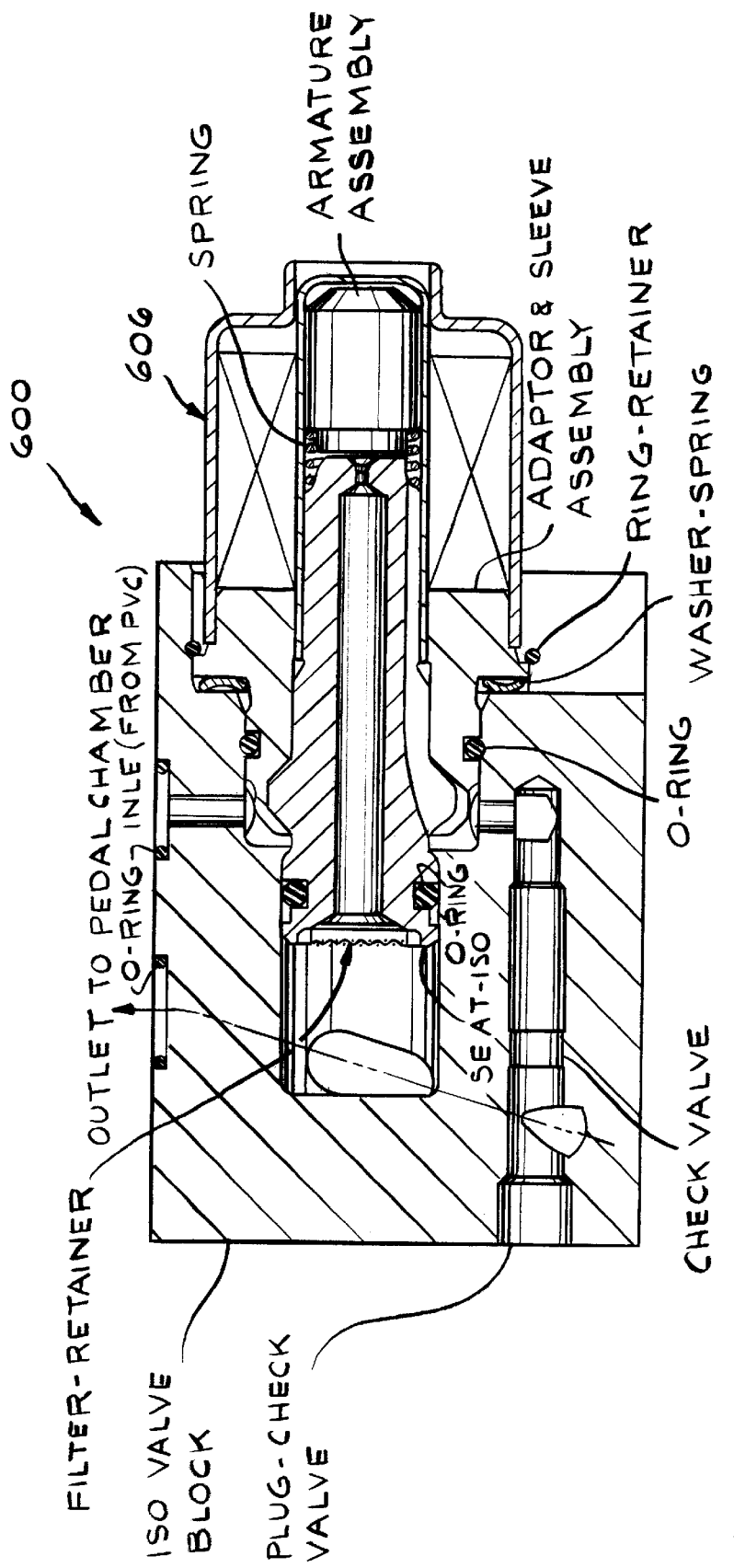
FIG. 23 is a partial sectional view of the integrated body taken along the lines 23—23 of FIG. 13.
Figure 24:
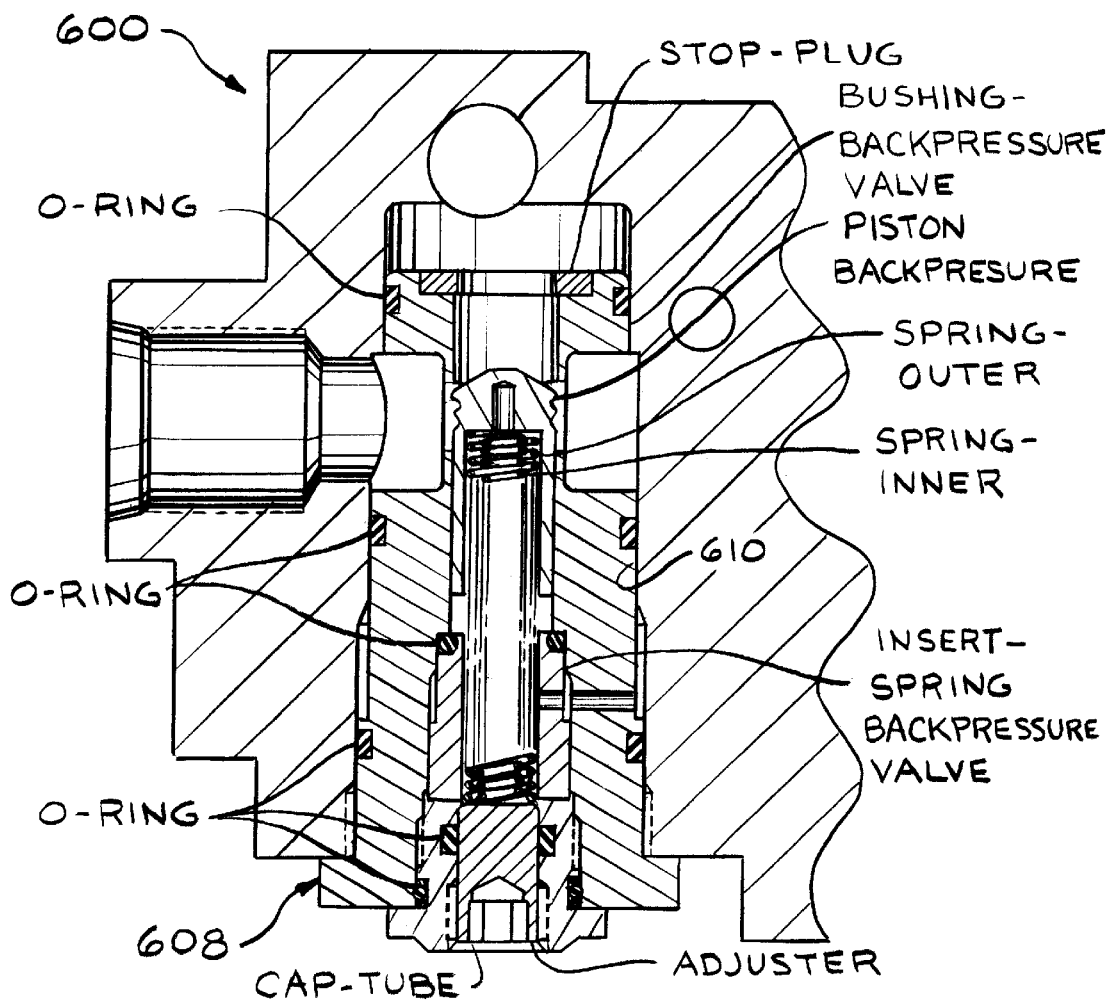
FIG. 24 is a partial sectional view of the integrated body 600 taken along the lines 24—24 of FIG. 15.
Figure 25:
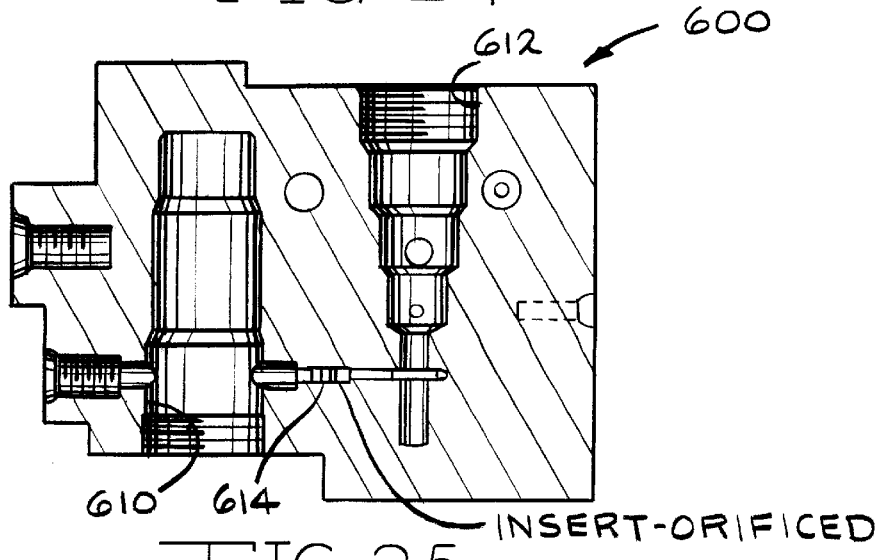
FIG. 25 is a partial sectional view of the integrated body 600 taken along the lines 25—25 of FIG. 15.
Figure 26:
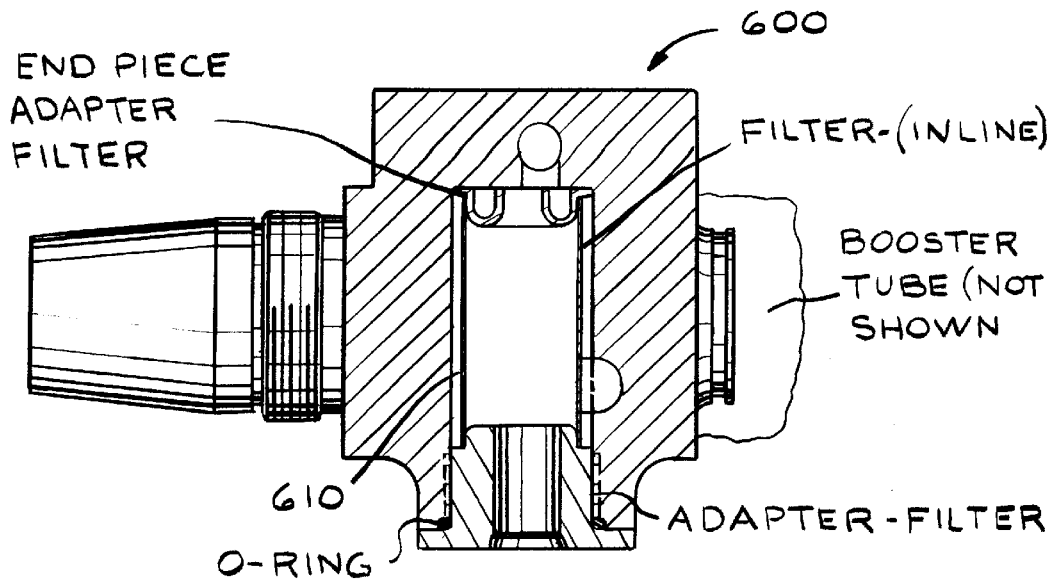
FIG. 26 is a sectional view of the integrated body 600 taken along the lines 26—26 of FIG. 13.
Figure 27:
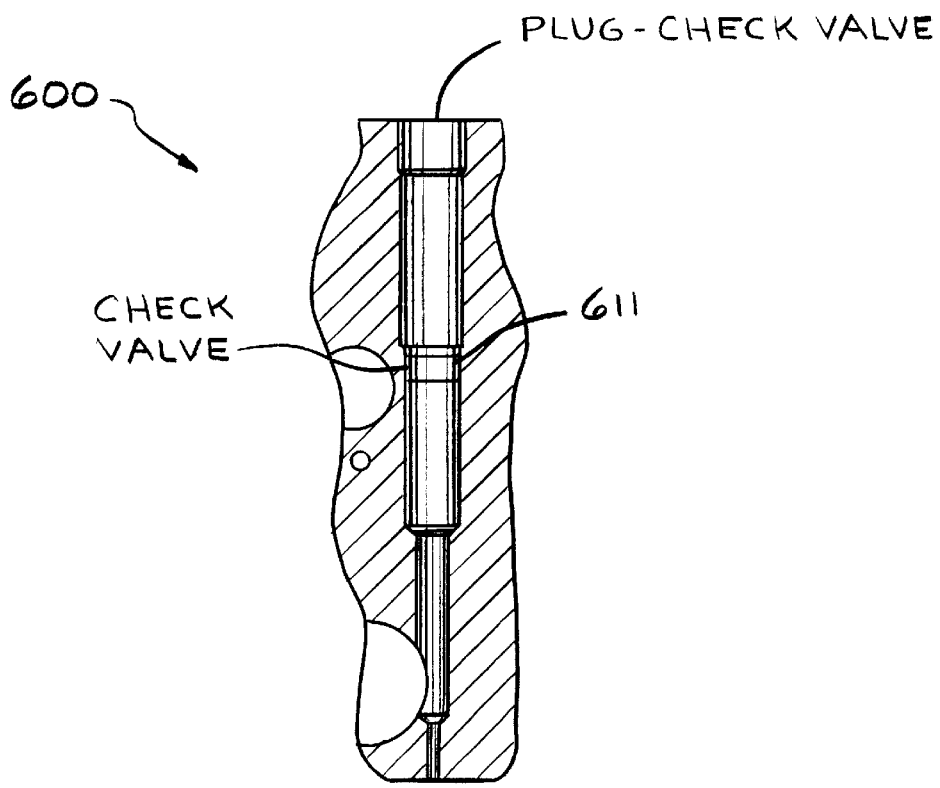
FIG. 27 is a partial sectional view of the integrated body 600 taken along the lines 27—27 of FIG. 16.

FIG. 22 is a sectional view of the integrated body taken along lines 22—22 of FIG. 14, showing the pressure control valve 604. FIG. 23 is a sectional view of the integrated body taken along lines 23—23 of FIG. 13, showing the travel limit isolation valve 606. FIG. 24 is a partial sectional view of the integrated body 600 taken along lines 24—24 of FIG. 15, showing the back pressure valve 608. FIG. 25 is a sectional view of the integrated body 600 taken along lines 25—25 of FIG. 15, showing bores 610 and 612 which house the back pressure valve 608 and the pressure control valve 604, respectively. The bores 610 and 612 communicate through an orifice insert 614. FIG. 26 is a sectional view of the integrated body 600 taken along lines 26—26 of FIG. 13, showing the filter 610. FIG. 27 is a partial sectional view of the integrated body 600 taken along 27—27 of FIG. 16, showing the check valve 611.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle hydraulic system comprising:

a pressure source for supplying pressurized hydraulic fluid;

a vehicle braking system having a hydraulically operated boost piston assembly for supplementing a force exerted by a vehicle operator to operate brakes of the vehicle braking system;

a boost pressure control valve for selectively directing pressurized hydraulic fluid from said pressure source to said boost piston assembly and venting hydraulic fluid from said boost piston assembly;

a sensor for receiving an input from a vehicle operator and supplying an electrical signal to said boost pressure control valve to control the operation thereof;

wherein said boost piston assembly includes a hollow housing having an inner wall defining a boost chamber and an input chamber therein, said boost piston assembly further including a boost piston in sliding sealing contact with said inner wall within said boost chamber and extending into said input chamber, said boost piston assembly further including a seal preventing fluid communication between said input chamber and said boost chamber, and including an input piston operatively connected to a brake pedal arm which is directly engaged with a brake pedal, said input piston being in sliding sealing contact with said inner wall within said input chamber, said brake pedal arm selectively urging said input piston to move in a first direction to move said boost piston in said first direction in order to actuate the brakes, said pressurized hydraulic fluid being electively supplied to and vented from said boost chamber to selectively aid said brake pedal arm in urging said boost piston to move in said first direction; and a pressure controlling valve selectively admitting a portion of said pressurized hydraulic fluid supplied to said boost chamber and to said input chamber, whereby the pressure in said input chamber can be controlled independently of the pressure in said boost chamber.

2. A brake booster comprising:

a housing defining an axial bore therein;

a boost piston slidable in said bore and cooperating with said housing to define a boost chamber;

an input member selectively movable by an operator;

an input piston slidable in said bore, said input piston and said boost piston cooperating with said housing to define a pedal chamber, said input member contacting said input piston to selectively urge said input piston in a first direction, said boost piston being urged in said first direction as a consequence of said input piston moving in said first direction;

an output member adapted to operatively connect said boost piston to a master cylinder piston of a brake system master cylinder;

a controller for selectively admitting a pressurized hydraulic fluid into said boost chamber to urge said boost piston to move such that said boost piston exerts a second force on said output member which is greater than said first force;

a first fluid conduit through which said controller supplies said pressurized hydraulic fluid to said pedal chamber;

a second fluid conduit providing fluid communication between said first fluid conduit and said boost chamber, wherein a check valve is disposed in said second fluid conduit permitting hydraulic fluid to flow through said check valve in a direction to said boost chamber and preventing hydraulic fluid from flowing through said check valve in a direction from said boost chamber to said first fluid conduit; and a third fluid conduit providing fluid communication between said first fluid conduit and said boost chamber around said check valve, said third fluid conduit including an orifice restricting the flow of hydraulic fluid in said third fluid conduit.

3. A brake booster comprising:

a housing defining an axial bore therein;

a boost piston slidable in said bore and cooperating with said housing to define a boost chamber;

an input member selectively movable by an operator;

an input piston slidable in said bore, said input piston and said boost piston cooperating with said housing to define a pedal chamber, said input member contacting said input piston to selectively urge said input piston in a first direction, said boost piston being urged in said first direction as a consequence of said input piston moving in said first direction;

an output member adapted to operatively connect said boost piston to a master cylinder piston of a brake system master cylinder;

a controller for selectively admitting a pressurized hydraulic fluid into said boost chamber to urge said boost piston to move such that said boost piston exerts a second force on said output member which is greater than said first force;

at least one fluid conduit between a source of said pressurized hydraulic fluid and a reservoir of relatively unpressurized hydraulic fluid;

a first pressure control valve situated in said fluid conduit and responsive to said controller for selectively supplying said pressurized hydraulic fluid from said fluid conduit to said pedal chamber and venting from said pedal chamber to said reservoir; and a second pressure control valve situated in said fluid conduit and responsive to said controller for selectively supplying said pressurized hydraulic fluid from said fluid conduit to said boost chamber and venting from said boost chamber to said reservoir.

4. The brake booster of claim 3, wherein said first and second pressure control valves are disposed in series in said fluid conduit.

5. The brake booster of claim 3 further including a power steering valve situated in said fluid conduit between said pressure control valves and said reservoir.

6. A brake booster adapted to be operated by a brake pedal, said brake booster comprising:

an input rod adapted to be operatively connected to the brake pedal, said input rod movable in a first direction when the brake pedal is actuated;

a housing having a bore formed therein;

an input piston disposed in said bore of said housing, said input rod directly engaged with said input piston such that said input piston moves with said input rod when said input rod is moved in said first direction;

a boost piston disposed in said bore of said housing;

wherein said bore, said input piston, and said boost piston define an input chamber in fluid communication with a source of pressurized fluid such that an increase in pressure of said input chamber urges said boost piston in said first direction and urges said input piston in a second opposite direction; and wherein said bore and said boost piston define a boost chamber in fluid communication a source of pressurized fluid such that an increase in pressure of said boost chamber urges said boost piston in said first direction.

7. The brake booster of claim 6 wherein an increase in pressure in said boost chamber only urges said boost piston in said first direction.

8. The brake booster of claim 6, wherein said housing includes a conduit in fluid communication between said input chamber and said boost chamber.

9. The brake booster of claim 8 further including a check valve disposed in said conduit permitting fluid to flow through said check valve in a direction to said boost chamber and preventing fluid from flowing through said check valve in a direction from said boost chamber to said input chamber.

10. The brake boost of claim 9 further including a second conduit in fluid communication between said input chamber and said boost chamber, said second conduit including an orifice restricting the flow of fluid through said second conduit.

11. The brake booster of claim 8 further including a valve for controlling the pressure between said input chamber and said boost chamber via said conduit.

12. The brake booster of claim 11 further including:

a third conduit in fluid communication between a source of said pressurized hydraulic fluid and a reservoir of relatively unpressurized hydraulic fluid;

a first pressure control valve situated in said third conduit for selectively supplying pressurized fluid from said third conduit to said input chamber and venting from said input chamber to the reservoir; and a second pressure control valve situated in said third conduit for selectively supplying pressurized fluid from said third conduit to said boost chamber and venting from said boost chamber to the reservoir.

13. The brake booster of claim 12, wherein said first and second pressure control valves are disposed in series in said third conduit.

* * * * *